(12) United States Patent
Niu et al.

(10) Patent No.: US 11,795,407 B2
(45) Date of Patent: Oct. 24, 2023

(54) GASIFIER FOR ORGANIC SOLID WASTE BY INJECTION INTO MOLTEN IRON AND SLAG BATH

(71) Applicant: Qiang Niu, Beijing (CN)

(72) Inventors: Qiang Niu, Beijing (CN); Tianjun Yang, Beijing (CN); Min Li, Jiangmen (CN); Jianliang Zhang, Beijing (CN); Zhancheng Guo, Beijing (CN); Jianming Pang, Beijing (CN); Guohua Yu, Jinan (CN); Hongbiao Dong, Oxford (GB)

(73) Assignee: Qiang Niu, Beijing (CN)

( * ) Notice: Subject to any disclaimer, the term of this patent is extended or adjusted under 35 U.S.C. 154(b) by 634 days.

(21) Appl. No.: 17/046,771

(22) PCT Filed: Mar. 19, 2020

(86) PCT No.: PCT/CN2020/080167
§ 371 (c)(1),
(2) Date: Oct. 10, 2020

(87) PCT Pub. No.: WO2021/042699
PCT Pub. Date: Mar. 11, 2021

(65) Prior Publication Data
US 2021/0324280 A1      Oct. 21, 2021

(30) Foreign Application Priority Data
Sep. 3, 2019     (CN) .......................... 201910827041.0

(51) Int. Cl.
*C10J 3/84*     (2006.01)
*C01B 3/02*     (2006.01)
(Continued)

(52) U.S. Cl.
CPC .................. *C10J 3/84* (2013.01); *C01B 3/02* (2013.01); *C10J 3/57* (2013.01); *C10J 3/78* (2013.01);
(Continued)

(58) Field of Classification Search
CPC ......... C10J 3/84; C10J 3/57; C10J 3/78; C10J 2200/09; C10J 2200/152; C10J 2300/0946;
(Continued)

(56) References Cited

U.S. PATENT DOCUMENTS 1,803,221 A    4/1931  Tyrer
2,647,045 A    7/1953  Rummel
(Continued)

FOREIGN PATENT DOCUMENTS

CN          1033276 C      11/1996
CN        101248312 A       8/2008
(Continued)

OTHER PUBLICATIONS

Tianjun Yang et al., Smelting Reduction, Metallurgical Reaction Engineering Series, 1998, pp. 1-146, Metallurgical Industry Press.
(Continued)

*Primary Examiner* — David J Laux
(74) *Attorney, Agent, or Firm* — Bayramoglu Law Offices LLC

(57) ABSTRACT

A gasifier for organic solid waste by injection into molten iron and slag bath includes a gasification furnace, a liquid level adjusting furnace and a slag discharge and heat exchange shaft furnace. The liquid level adjusting furnace, in communication with the bottom of the gasification furnace, contains 1200-1700° C. molten iron-based alloy liquid, which is covered with molten liquid slag layer. When gas pressure above or liquid volume in the liquid level adjusting furnace increases, liquid level of the molten liquid
(Continued)

in the gasification furnace rises simultaneously. A particle material injection lance is immersed, through which organic particles to be gasified are blown into molten bath, and oxygen gas or oxygen-enriched air as gasifying agent is blown into the melt at the same time. Organic substance is gasified into CO-rich and $H_2$-rich syngas, and most of inorganic substance enters molten slag and is discharged termly.

11 Claims, 9 Drawing Sheets

(51) Int. Cl.
    *C10J 3/78*     (2006.01)
    *C10J 3/57*     (2006.01)
    *C21B 13/00*     (2006.01)

(52) U.S. Cl.
    CPC ....... *C21B 13/0026* (2013.01); *C10J 2200/09* (2013.01); *C10J 2200/152* (2013.01); *C10J 2300/0946* (2013.01); *C10J 2300/1246* (2013.01); *C10J 2300/1807* (2013.01)

(58) Field of Classification Search
    CPC ....... C10J 2300/1246; C10J 2300/1807; C01B 3/02; C21B 13/0026
    See application file for complete search history.

(56) References Cited

U.S. PATENT DOCUMENTS

| | | |
|---|---|---|
| 4,187,672 A | 2/1980 | Rasor |
| 4,244,180 A | 1/1981 | Rasor |
| 4,388,084 A | 6/1983 | Okane et al. |
| 4,496,369 A | 1/1985 | Torneman |
| 4,511,372 A | 4/1985 | Axelsson |
| 4,574,714 A | 3/1986 | Bach et al. |
| 4,602,574 A | 7/1986 | Bach et al. |
| 4,659,375 A | 4/1987 | Geskin |
| 5,943,970 A | 8/1999 | Gonopolsky et al. |
| 6,110,239 A | 8/2000 | Malone et al. |

FOREIGN PATENT DOCUMENTS

| | | |
|---|---|---|
| CN | 102057020 B | 1/2015 |
| CN | 105176595 A | 12/2015 |
| CN | 106086281 A | 11/2016 |
| CN | 106753573 A | 5/2017 |
| CN | 208362272 U | 1/2019 |
| CN | 110396435 A | 11/2019 |
| EP | 0129256 A2 | 12/1984 |
| JP | 2019073638 A | 5/2019 |
| WO | 2004044492 A1 | 5/2004 |
| WO | 2014132230 A1 | 9/2014 |

OTHER PUBLICATIONS

Dongbo Li et al., (Modern) Side-Blown (Smelting) Metallurgy Technology of Modern Non-Ferrous Metals, 2019, Metallurgical Industry Press.

Jiankun Zhuo, et al., Clean Coal Technology, 2015, the Chemical Industry Press.

Kiangjing Xu, et al., Coal Gasification Production Technology, 2015, Chemical Industry Press.

Tianjun Yang et al., Smelting Reduction Technology, Metallurgical Reaction Engineering Series, 1991, pp. 1-144, Metallurgical Industry Press.

GASIFIER FOR ORGANIC SOLID WASTE BY INJECTION INTO MOLTEN IRON AND SLAG BATH

CROSS-REFERENCE TO THE RELATED APPLICATIONS

This application is the national stage entry of International Application No. PCT/CN2020/080167, filed on Mar. 19, 2020, which is based upon and claims priority to Chinese Patent Application No. 201910827041.0, filed on Sep. 3, 2019, the entire contents of which are incorporated herein by reference.

TECHNICAL FIELD

The present invention relates to the field of chemical industry and classification number of C10J3, and more particularly to a gasifier for organic solid waste by injection into molten iron and slag bath.

BACKGROUND

Since human society entered industrialization, the amount of garbage and waste discharged from social life and production processes has been growing and accumulating surprisingly, which has become a major ecological and environmental problem that human society must confront. Although landfill, incineration, compost and other methods are used to deal with solid waste, especially organic wastes, the speed and volume of current treatment methods are either difficult to adapt to rapid growth of solid waste, or have new secondary pollution in the process. They have high treatment cost, or they are difficult to be continued due to the restrictions on land capacity. Countries around the world have varying degrees of problems with garbage siege, solid waste occupying human living space, and solid waste leading to deterioration of the ecological environment.

In the smelting process of modern ironmaking and steelmaking and non-ferrous metallurgy, the high-speed gas jet is blown into the molten metal or molten slag by an injection lance to form a fierce gas-liquid mixed flow, and bring about intense stirring of the molten bath. This method constitutes a good mixing condition in reaction dynamics, and has good effect on momentum transfer, heat transfer and mass transfer of molten metal or molten slag bath, which are called "process strengthening" means in the industry. This is also a technical path for improving efficiency and increasing yield of modern metallurgical science and technology.

Furthermore, the so-called reaction conditions of the molten iron bath and molten slag bath is formed by injecting a high-speed gas jet into a molten metal or molten slag, and using the high-speed gas jet as a carrier gas to blow solid phase particles into the molten metal and the molten slag. The gas-solid-liquid three-phase is fully mixed under the stirring of the dynamic energy of the gas jet, and the total reaction rate is further increased rapidly, especially the solid phase particles, which have larger specific surface areas than the bulk solids, and are better in contact with bubbles and molten bath so as to greatly improve the reaction efficiency.

In the ironmaking and steelmaking industrial practices, such as molten iron pretreatment of torpedo ladle, blast-furnace iron-making, converter steelmaking, smelting reduction iron-making, and bath smelting of non-ferrous heavy metals lead, zinc, copper, nickel, tin, the molten iron bath reaction and molten slag bath reaction formed by injecting of fuel, desulfurizer powder, ore powder, etc. into the molten metal bath and molten slag bath, are already a fairly mature unit operation, showing great advantages in speed and efficiency.

The smelting process of ironmaking and steelmaking will be described in further detail below. The iron and steel industry has three important functions. The first is the production of steel products, which is well known to the whole society. There are two other functions that are often not known to the public, which are the function of treating a large amount of solid waste from society and other industries, and the energy conversion function therewith. These two other functions are closely related. Solid waste has been treated consciously in iron and steel industry in Germany, Japan and other countries since the 1980s. For example, blast furnace injection of waste plastics instead of coal injection has achieved very good results. Although blast furnace injection of waste plastics is not a treatment method for molten iron bath and molten slag bath, it already has a prototype of the second function of iron and steel industry. As for the third function, iron and steel enterprises have provided gas, electricity and heating to the surrounding communities for more than decades. At this stage, the iron and steel industry's treatment of waste, and the provision of coal energy to the society by another gas fuel, hot water vapor, hot water, electricity, etc. have achieved. The main function for production of steel products, has not been diluted. It just plays its environmental function in a collaborative way. A more thorough approach is to abandon production of iron and steel, but to use more mature reaction processes, equipment and unit operation of molten iron bath and molten slag bath in ironmaking and steelmaking. Organic solid waste is blown into the molten bath at high speed by using an efficient dual molten bath method, and the gasification agent is blown in for thorough treatment and conversion. Hydrocarbon elements are converted into clean syngassyngas, most of inorganic substances enter the molten slag to achieve reduction and hazardous treatment. The syngassyngas can be used as fuel gas, or to provide qualified raw material gas for the next chemical synthesis by appropriately changing the H/C ratio, which will bring revolutionary influence for human environmental conditions and energy structure.

The dual molten bath composed of the molten iron bath and the molten slag bath is used as a catalyst to treat organic solid phase particles blown at high speed, and is used to gasify organic waste in the presence of oxygen. Its main advantages are as follows. (1) Ultra-high-temperature rapid pyrolysis of hydrocarbons is achieved. The temperature of molten iron bath and molten slag bath is as high as 1400-1600° C., and organic molecules are rapidly pyrolyzed into a carbon product within tens of milliseconds after being contacted, especially in the state of being blown and surrounded by molten iron and molten slag. The carbon atoms are dissolved into the molten iron, and the hydrogen atoms are combined into hydrogen gas molecules to escape the molten bath. (2) Rapid reaction of dissolved carbon and oxygen is achieved. Oxygen is introduced into the molten bath to form FeO with iron. FeO is in a dynamic pyrolysis-combination equilibrium. A certain amount of [O] is dissolved in the molten iron. The reaction speed of dissolved oxygen and carbon is 1-2 orders faster than that of solid carbon and oxygen in air. CO gas is quickly generated to escape the molten iron, and is mixed with hydrogen gas to form syngas. (3) No complicated organic intermediates is generated. Organic materials are pyrolyzed into monoatomic inorganic or diatomic gas molecules due to ultra-high temperature above 1400° C. without any complicated organic substance and intermediates, such as relatively fatal dioxine intermediates and other organics such as tar. (4) The carbon conversion rate is high. There is almost no residual undecomposable organic substance, and the conversion rate of carbon atom is as high as 98-99%. Almost all organic substance is converted into the simplest inorganic substance-dissolved carbon or carbon monoxide gas and hydrogen gas. (5) Sulfur elements are thoroughly absorbed. Sulfur elements are absorbed by the molten iron to form FeS, which has a high solubility in the molten iron. The sulfur is very quickly absorbed by iron bath and the sulfur content in the syngas is extremely low. The sulfur is transferred from the molten iron to the high-basicity slag and removed as CaS dissolved in the slag by injecting lime and limestone particles. (6) The molten iron bath and molten slag bath can play multiple roles and functions, such as liquid catalyst, catalyst, dispersant, heat storage body, flowing matrix, regulator of temperature and heat buffer, carbon solution, oxygen dissolve body, and carrier for rapid reaction of carbon and oxygen; the molten iron being a sulfur absorber, filter for a gas product detergent, a gas product purifying agent, the molten slag being an inorganic absorber, a high alkalinity slag being a final sulfur absorber, a sealing body package for a heavy-density liquid, etc.

The advantages of the molten iron bath are obvious compared to other treatment methods of organic waste. A simple comparison is as follows:

Waste incineration. In terms of the final product, waste incineration only has thermal energy and does not produce any gas chemical products. The temperature during the waste incineration process is generally only 600-900° C. It is easy to produce toxic and harmful intermediate organic compounds represented by dioxins. It is necessary to add high-quality fuel to increase its combustion temperature. The combustion process is unstable and easily fluctuates. The combustion temperature is much lower than the ultra-high temperature above 1400° C. of the molten iron bath. Organic substance often remains during the incineration process and requires secondary treatment.

Plastic pyrolysis. It usually takes 300-400 years for plastics to degrade naturally. However plastics can be converted into clean fuel gas at 0.1 second in the molten iron bath furnace. Although thermal pyrolysis by other heating methods can produce some hydrocarbon products similar to petrochemicals, the temperature of the conversion process is low, the amount of smoke is large, a large amount of secondary pollution is generated, the amount of residue is large and complex, and it is easy to produce secondary pollution, and it has low conversion rate.

Microbial degradation such as compost fermentation. Compost fermentation is a low-cost treatment method to produces biogas for waste of some agriculture, forestry, and animal husbandry. However, biological fermentation is affected by many uncertain factors, such as season and temperature. Biogas cannot be produced in winter in some cold regions, and the biological fermentation has low efficiency and speed, and is not suitable for large-scale conversion. In particular, the amount of antibiotic residues in livestock and poultry manure is large. Antibiotics can kill microorganisms that are used to degrade biomass, resulting in loss of microbial activity. The molten iron bath has an extremely high temperature, and the reaction speed is not affected by any natural environment. It is powerful tool for large-scale and rapid treatment of biomass and energy conversion.

Plasma ultra-high temperature pyrolysis. The plasma high-temperature pyrolysis is now commonly used for hazardous waste. The temperature of plasma high-temperature pyrolysis does achieve ultra-high temperature, which makes the hazardous waste to be treated more completely pyrolyzed and converted, but the defects are also obvious. One is that the plasma needs to consume electricity, but the molten iron bath itself can provide energy to the outside. Consuming and providing energy show a huge difference in economics. In addition, the plasma lance is expensive and the power is very small. A typical molten iron bath furnace can produce thermal energy with a power close to the GW level, while a typical plasma lance has a power less than 100 KW level. The difference is about 10,000 times. The Plasma ultra-high temperature pyrolysis cannot become main treatment method for a large amount of solid waste. Moreover, although the temperature of the plasma lance is high, its material heating is also exposed in the air. It is still possible to produce toxicity of intermediate complex organics in the heating process. As for the high-temperature molten iron bath, due to the tight wrapping of the molten iron and slag, the gas inevitably contains almost no organic matter after it is flushed out of the dual molten bath.

Molten iron bath has important advantages even in terms of coal gasification. Conventional coal gasification is often concentrated in three types: fixed bed, fluidized bed, and entrained bed, and the process equipment technology has been developed very maturely, reaching the level of being able to gasify more than 2,000 tons of coal per day and night in a single furnace. However, the existing gasifiers are still picky about coal types, and the requirements for coal coking, cohesiveness, ash smelting point, reactivity, particle size, thermal stability, slurryability, and moisture content are relatively harsh. Each gasifier has its own specific requirements for the coal type, which is not very suitable for other coal types. The molten iron bath can gasify almost any organic substance because its flowing matrix is a molten iron bath, and is highly adaptable to different types of coal. Domestic garbage can even be gasified. In addition, the gasification product does not contain any oxidizing gas, and gas phase does not contain sulfur, tar and the like, and the molten iron bath method has simple composition and stable operation.

The molten iron bath not only has great advantages in the treatment of solid waste, but also has the greater advantage that most of domestic garbage, agricultural and forestry wastes on the earth such as straw/branch/sweet sorghum/sawdust/seaweed, livestock manure, waste plastic, waste rubber tires, etc. are converted into clean fuel gas, and then converted into petrochemical products, such as synthetic high-quality gasoline and diesel, paraffin, naphtha, lubricant, synthetic natural gas, olefins, polyolefins, alcohol ethers and other products.

China, for example, has accumulated 70 billion tons of solid waste in history, a large proportion of which is organic substance. Billions of tons of solid waste are added each year, of which 1 billion tons are agricultural solid waste, 1.7 billion tons are livestock and poultry manure, and 400 million tons are domestic waste. Hundreds of millions tons of oil and gas products can be produced by conversion in the molten iron bath. China's external dependence on liquid fossil energy and gas fossil energy can be reduced, and carbon emissions during the use of fossil energy can also be reduced. Domestic garbage and biomass waste are made into gas and liquid energy, which are carbon neutral and do not increase atmospheric carbon dioxide emissions.

The biomass produced by photosynthesis on the earth is as high as 150 billion tons every year. After deducting the water, the amount of the absolutely dry biomass is as high as tens of billions of tons. Billions of tons of oil and gas products which basically reach the current consumption level of fossil energy can be produced by using molten iron bath treatment method. This means that human society in the earth can begin to bid farewell to the fossil energy era and enter to the biomass energy era by conversion effect of the molten iron bath. Photosynthesis-molten iron bath conversion forms a closed loop cycle relying on the process strengthen conversion effect of the molten iron bath. Garbage siege and dependence on fossil energy have become history. Simultaneously, it also means that the tense global political and economic relations caused by the current globalization of fossil energy layout will also usher in a great degree of ease. If peoples of the world can rely on the biomass produced by photosynthesis from sun in their land, the oil and gas resources required by modern society are synthesized, and then a fierce competition in the Middle East is no longer necessary.

Overall, molten iron bath is simple and has extremely high efficiency in terms of treating solid waste and biomass resources compared to traditional processes. It can even be called ultimate version of perfect method, and is also a terminator of the garbage and organic solid waste. The molten iron bath opens the last key link to replace fossil energy with biomass of photosynthesis, from an energy point of view, which opens up a new path for humans to no longer rely on fossil energy, and also helps to end fierce competition and fight for oil and gas in the Middle East and other regions.

In fact, core, mantle, and crust reactors carried out in the depths of the earth also have similar triple-transboundary properties. The molten iron-nickel alloy in the depths of the earth will slowly transport the biomass and carbonates in the shallow layer of the earth to the depth of the earth in the geological activities of the earth. The biomass and carbonates will be degraded or reduced to low valence carbon after contacting the molten iron. Water will also be reduced to hydrogen by the molten iron. Carbon monoxide or carbon element and the hydrogen gas, under the action of iron oxide catalysts under extremely high pressure and a certain temperature, can react to produce hydrocarbons, and then form oil and gas resources. In a sense, this slow geological process is actively applied by humans, which means that the simulated mantle reactor can greatly promote the carbon conversion of the earth.

Da-Guang Wang, Yu-Sheng Xie, Zhan-Cheng Guo, etc. of the Institute of Chemical Metallurgy (now Institute of Process Engineering), Chinese Academy of Sciences filed a "Coal-oxygen-ore-flux compound jet iron-bathing gas-making and iron-smelting" Chinese patent application with application number of 93104740.1 in 1993, which is earlier patent document of gasification in molten iron bath in China. Although the objective of gasification in molten iron bath is to make iron, if the "ore" in its four inputs is abandoned, it is equivalent to gasification and gas-making of the coal-oxygen-flux three components in the molten iron bath.

In U.S. Pat. No. 1,803,221, inventors described that organic hydrocarbons are introduced into a molten metal pool to produce hydrogen gas, and the carbon elements are dissolved in the molten metal and oxidized by the oxygen that is blown in.

Taking the molten slag as a gasification media, the combustible materials are blown below the liquid level of the molten slag for gasification, which makes the molten slag move in U.S. Pat. No. 2,647,045. Hydrocarbons such as coal are blown onto the surface of the molten iron using unimmersed injection lance for gasification and gas-making by taking molten iron bath as a gasification media in U.S. Pat. No. 4,388,084.

In U.S. Pat. Nos. 4,574,714 and 4,602,574, toxic or waste organic substances are blown into the molten pool for gasification to achieve harmless treatment in similar steelmaking equipment.

In U.S. Pat. No. 6,110,239, the molten iron bath with two regions is used to gasify the organic substances. One region is a feeding region, which is used to contact the organic substances with the molten iron bath for pyrolysis to produce hydrogen gas, which escapes separately. The carbon is dissolved in the molten iron bath and flows to the oxidation region, and Oxygen is introduced for gasification with carbon. The gas is mainly CO, so that hydrogen gas and CO gas are separately produced and collected. Similar method that several regions are used for gasification in the molten iron bath can also be found in U.S. Pat. Nos. 4,187,672 and 4,244,180. The single gasification region is used in U.S. Pat. Nos. 4,496,369, 4,511,372, 4,574,714 and 4,602,574, etc.

An international patent application, with Chinese patent application No. 200680020777.8 which is filed by a U.S. company disclosed that the accurate analysis and detection is used to obtain accurate data of raw materials in order to better treat organic and inorganic substances in the molten metal pool, gasify organic substances and vitrify inorganic substances.

An international patent application, with Chinese patent application No. 200980121557.8 which is filed by a glass company of France disclosed that organic substances contact the molten glass for gasification.

A Chinese patent with application No. 201510611503.7 which is filed by Tsinghua University disclosed that organic substances are gasified by contacting molten metal.

Professor Shulin Liu and Professor Tianjun Yang of University of Science and Technology Beijing, completed their book named by "smelting reduction technology" in 1989 and published it in 1991 by Metallurgical Industry Press (ISBN7-5024-0905-X). This book systematically summarized the smelting reduction technology research conducted at RWTH Aachen University in FRG and University of Science and Technology Beijing, as well as the laboratory research and industrial test research of non-blast furnace iron-making at that time, wherein "Smelting reduction method derived from converter technology" in the third chapter disclosed CIG method, CGS method, COIN method, and MIP method for gasificaton of coal in molten iron bath.

In 1998, Professor Tianjun Yang, Dr. Dianbing Huang and Professor Lingtan Kong completed their book named by "Smelting reduction" (ISBN7-5024-2150-5/TF 497 TF557) which is included in "Metallurgical Reaction Engineering Series" and is still published by the Metallurgical Industry Press. This book focused on the comprehensive elaboration and evaluation of non-blast furnace iron-making from the perspective of process operation, wherein gas production in the molten iron bath is one unit operation.

A book "Side-Blown Metallurgy Technology of Modern Non-Ferrous Metals" (ISBN 978-7-5024-7916-9) is published in the Metallurgical Industry Press in 2019, and written by Dongbo Li, Xuegang Chen and Zhongshi Wang. The book highlighted the research and industrial practice of heavy nonferrous metal molten pool smelting by China ENFI Engineering Co., Ltd. using a side-blown immersed combustion technology in recent years. If the amount of oxygen is reduced to incomplete oxidation, and the material to be blown is pulverized coal, the side-blown immersed combustion is also equivalent to gas production by immersed molten pool.

A book "Clean Coal Technology "(Second Edition) written by Jiankun Zhuo, Chao Chen, and Qiang Yao of Tsinghua University, was published by the Chemical Industry Press in 2015 (ISBN 978-7-122-24843-5), and was one of the "21st Century Sustainable Energy Series". In Chapter 5, when introducing coal gasification technology, the molten bed gasification method is specifically introduced, and classified into three methods of molten slag bed method, molten salt bed method and molten iron bed method, in addition to the main technologies of moving bed, fluidized bed, and entrained bed.

As in the above book, a book "Coal Gasification Production Technology" (Third Edition, 2015 Edition) edited by Xiangjing Xu and Kefeng Zhang published by Chemical Industry Press (ISBN 978-7-122-24727-8), made same classification and description of coal gasification in the molten bed.

Shandong molong petroleum machinery Co., LTD (Stock Code: 002490) acquired the intellectual property rights of the pilot plant of the molten iron-making HIsmlet process originally owned by Rio Tinto mining giant (Rio Tinto Group) in Kwinana, Australia, and re-established it in Shandong, China. Professors Tianjun Yang and Jianliang Zhang from University of Science and Technology Beijing led a team to optimize the process. The technical teams of Shandong Metallurgical Design Institute and Shougang International Engineering Company carried out equipment optimization and engineering construction improvements. It has been superior to the original factory. 90 tons of pulverized coal per hour is blown into the molten pool to produce gas, which provides the molten pool thermal energy and dissolved carbon reducing agent. Its unit operation is similar to that of gas production in molten iron bath. The produced molten iron has already been commercially competitive with the blast furnace. This technological achievement achieved stable operation in 2017, and was certified in 2018.

Based on the above-mentioned patents and technical documents, from decades of industrial practice of unit operations of ironmaking and steelmaking and non-ferrous metallurgy, more importantly the following problems have not been effectively solved.

(1) Service life of injection lance. The relatively effective injection way of organic particles is to immerse them below the liquid level of the molten for being blown. There are a large number of industrial practices in ironmaking and steelmaking, non-ferrous metal pool smelting, and immersion combustion in glass furnace. However the immersion combustion is a great challenge to the life of the injection lance. For example, in the process of ironmaking and steelmaking, in the desulfuration operation of molten iron produced by blast furnace before entering converter for steel-making, the injection lance is often inserted into the molten iron to blow some alkaline materials for desulfuration operation. This injection lance is made of refractory material and lined with steel pipe. The typical immersion time into the molten liquid is 10 minutes each time, and the service life of the injection lance is only dozens of times. This is far from the thousands of hours required for coal gasification, garbage and biomass gasification equipment. In some ironmaking and steelmaking operations, consumable oxygen lances are used. The steel pipe is both an oxygen injection nozzle and a consumable material in itself. It is constantly worn out and needs follow-up continuous compensation to enable the injection operation to continue. This can be used as a helpless option in open operation. However, in the closed space required for gasification, the problems such as sealing of the insertion port make it not a long-term and feasible routine practice.

From the perspective of degree of immersion, it is optimal to insert into the molten iron. Organic substance particles are supplied to the depth of the molten iron, and ultra-high temperature pyrolysis is performed under heating to obtain dissolved carbon and hydrogen gas to escape. Oxygen gas is blown into the molten iron while maintaining a certain concentration of dissolved carbon, almost all C is reacted to obtain CO instead of carbon dioxide gas, and the gasification process is quite smooth and reliable. However, the perfection of the chemical process cannot withstand the practical problem that the service life of the injection lance is too short. The service life of the injection lance is often in the range of several hours and even difficult to exceed tens of hours due to the huge heat flow and strong scouring force of the molten iron when the end of the injection lance is immersed in the molten iron, so the injection lance is replaced very frequently. It is possible to do this for several hours in short scientific experiments, but frequent equipment replacement is a nightmare in the large-scale industrial production process.

At present, a relatively compromised approach is that the injection lance of furnace materials is inserted into the molten slag liquid instead of directly inserting into the molten iron. The molten slag liquid has lower heat flow strength and a much lower heat-transfer capability than the molten iron, and has a higher viscosity so that scouring force is smaller, and the service life of the injection lance is greatly improved than that in the molten iron. But even so, injection lances made of refractory materials are difficult to achieve ideal service life in the industry. Later, one was more inclined to use water-cooled injection lances, which use water cooling to take away a lot of heat energy, and cool the injection lances to extend service life. The part on the outside of the injection lance contacting the molten slag, which is cooled and condensed to form a condensation shell, can protect the injection lance. It is essentially a water-cooled casing, and the real injection lance pipe is inside. The material heat transfer coefficient of steel water-cooling parts is not enough to achieve a high heat transfer effect. Copper materials with better thermal conductivity must be used, but copper materials are expensive, and the price of injection lances is high. The copper materials have a soft texture and poor abrasion resistance. The wear caused by the high-speed furnace materials particles is quite large, so innermost part of the injection lance can only be made of abrasion-resistant steel materials for forming injection pipe. Simultaneously, copper materials are not enough to support the overall structure because of their low strength, large heat deformation and small rigidity. Copper-steel composite water-cooled parts that compositing copper and steel are required. This composite material is produced by explosively compositing two different types of metal plates to achieve metallurgical bonding, and have long processing cycles and difficult process. Due to the use of explosives in the explosive composition process and the safety and nuisance characteristics of the explosion itself, the time and place of the explosive composition operation are strictly controlled by the government. Only a few franchised enterprises in the remote mountains can carry out the explosive composition of copper and steel composite plates on a specific date. This processing capability and management system is only available in highly developed industrialized countries. In the operation of such gasification production lines in countries with weak industrial foundations, the preparation and import of composite water-cooled injection lances will be a relatively complicated equipment link that is difficult to popularize.

More importantly, the use of water-cooled parts means that the part immediately adjacent to the high-temperature molten slag and molten iron is full of water flow, and there is a huge safety risk. Extremely serious explosions will occur when liquid water contacts with high-temperature molten slag and molten iron, which will leads to major safety production accidents, comprehensive damage of equipment, long term shutdown for rectification in enterprise, and even human casualties, so that the project completely fails. The operation and maintenance of such water-cooled equipment requires extremely strict real-time online monitoring and strict management system, and also requires staff with high quality and responsibility. Otherwise, it is only a substance of probability and time that water leakage, water pipe rupture and other subsequent major disasters occur.

(2) Loss and service life of furnace liner. Oxygen is introduced into the molten pool in order to oxidize dissolved carbon into CO gas, and FeO is first generated. In fact, the oxidation of dissolved carbon is completed by the dynamic pyrolysis and synthesis of FeO to release dissolved oxygen, and this leads to a certain amount of FeO content in the slag. If the organic solid waste to be gasified include materials have low-calorific values or high moisture contents such as domestic garbage, biomass, a certain ratio of secondary combustion is performed in the molten slag to release more secondary combustion heat to maintain constant temperature of entire molten slag bath and the molten iron bath. This inevitably requires that FeO content in the molten slag is further increased. If the molten slag contains a certain amount of FeO, the smelting point of the molten slag is reduced, the fluidity is increased, and mixing is more convenient. However, the erosion of the liquid slag containing FeO on the refractory liner is extremely serious. This molten slag is jokingly called "aqua regia" in the industry, which means that refractory material is quickly corroded after contacting it, causing the furnace liner material to lose efficacy and to fail to serve.

Similarly, one way to deal with this problem is to use water-cooled furnace walls, that is, water-cooled copper cooling walls, which are even made of expensive materials such as copper and steel composites. Water-cooled condensing shells of furnace slag are formed at the position where the inner wall contacts the molten slag for hindering further heat flow transfer. Although the amount of heat energy loss has increased, it can keep the furnace liner in service for a long time. As mentioned earlier, although the form of the water-cooled furnace wall can ensure the long-term use of the furnace liner, it is based on a complete set of industrial processes for relatively complete processing, installation, use, and maintenance of equipments. It is relatively easy to realize and safely operate in countries with a strong industrial foundation. The potential safety hazards and risks are also huge in many areas where energy is scarce, the industrial base is relatively weak, and the quality of labor and training are not complete.

(3) Large physical sensible heat loss of furnace gas and discharged hot slag. The sensible heat is large because the temperature of the discharged syngas and molten furnace slag is high. If the sensible heat of these two parts is not recovered, the heat loss is large.

(4) Inconvenient operation due to discontinuous slag discharge. If the unit operation of the steel industry is used for reference, the slag is periodically and discontinuously discharged instead of continuously discharged, and the operation continuity is not good.

(5) Difficult dust removal of high-temperature furnace gas. The temperature of initially obtained syngas after escaping molten bath reaches about 1500° C., and the dust content is large. If the secondary combustion rate in the slag is large, the temperature of the syngas may be higher, which brings great problems to cooling and dust removal.

(6) Gasification of hydrocarbons other than coal. For different types of coal, the gasifier developed has been relatively mature, but it is difficult to use a same gasifier between different coal types. However, it is difficult to use coal gasification equipment and processes for many other organic materials, especially those with complex sources and large fluctuations in composition such as biomass and domestic waste.

SUMMARY

In view of the deficiencies in the prior art, the present invention provides a gasifier for organic solid waste by injection into molten iron and slag bath.

The invention discloses a gasifier for organic solid waste by injection into molten iron and slag bath, which is used to blow organic solid waste particles into a molten iron bath and a molten slag bath floating on the molten iron bath, to perform ultra-high temperature pyrolysis and react with a gasifying agent to produce combustible syngas. The device includes:

a gasification furnace, which is a closed structure, a side wall of the gasification furnace being at least installed with one particle material injection lance capable of injecting solid particles and being immersed in the molten slag bath or the molten iron bath, and one supersonic jet injection lance being installed at the top of the gasification furnace;

a liquid level adjusting furnace which is a closed structure, the bottom of the liquid level adjusting furnace being in communication with the bottom of the gasification furnace through a communication pipe, an upper part of the liquid level adjusting furnace being provided with a molten iron pouring tank that is provided in communication with a sealing pressure-bearing mechanism, and a tapping hole being provided at the bottom of the liquid level adjusting furnace;

a slag discharge and heat exchange shaft furnace in communication with the upper part of the gasification furnace to hold the liquid molten slag autonomously overflowing from the gasification furnace, to cool the liquid molten slag to a low-temperature solid phase, and to discharge it.

The gasification furnace and liquid level adjusting furnace of the present invention can hold a 1200-1700° C. smelting iron bath (that is, a molten iron-based alloy liquid, the molten iron-based alloy liquid is an Fe—C melt containing at least element C, and the carbon content is 2-5 wt. %, wherein the gasification furnace can hold the molten iron-based alloy liquid with the depth of 600-2000 mm, and the thickness of the molten slag liquid thereon is 500-3000 mm) and the molten slag bath (molten slag liquid) above it. The gas pressure inside the liquid level adjusting furnace can be increased to 2-5 atmospheres of pressure through gas pressurization by the sealing pressure-bearing mechanism on the liquid level adjusting furnace, and then the molten iron-based alloy liquid in the liquid level adjusting furnace is pushed to flow to the gasification furnace, which causes the liquid level of the molten iron-based alloy liquid and the molten slag liquid in the gasification furnace to rise, and the liquid level of the molten slag liquid can immerse the nozzle of the particle material injection lance. The organic substance solid phase particles blown from the particle material injection lance with a carrier gas jet are blown into the molten slag bath to form the molten slag bath for gasification, and further penetrate the molten slag bath to reach the molten iron-based alloy liquid to form the molten iron bath for gasification. CO gas and hydrogen gas formed by carbon, hydrogen and oxygen in organic substances escape from the dual molten bath formed by the molten iron bath and the molten slag bath. As high-temperature dust-containing primary syngas, they move to the upper space of the gasification furnace. The absolute pressure of the high-temperature dust-containing syngas is 0.11-0.20 MPa, and the entire apparatus is in a gasification operation state at this time. The high-temperature dust-containing primary syngas is subjected to cooling and dust removing by a vaporization cooling flue, and sensible heat is further recovered by a dust removal and heat recovery boiler. The steam obtained from the vaporization cooling flue and the dust removal and heat recovery boiler is used to dry the organic materials to be gasified. The pressure above the liquid level adjusting furnace can be adjusted to return to one atmosphere, so that the liquid level of the molten iron-based alloy inside the liquid level adjusting furnace returns to the original position. Simultaneously, the liquid level of the molten iron-based alloy liquid and the molten slag liquid thereon in the gasification furnace is lowered to the height at normal pressure, and the immersed particle material injection lance is exposed. The gasification operation is suspended, and the entire apparatus is in a ready state. In this ready state in which the gasification operation is suspended, maintenance and replacement operations of the particle material injection lance can be performed. At this stage, the molten slag liquid accumulated on the bottom of the gasification furnace is blown by nitrogen gas supersonic jet from a supersonic jet injection lance, so that it is splashed on the wall of the gasification furnace, and realizes the furnace liner maintenance operation by splashing the molten slag for protecting gasification furnace. It is worth noted that the particle material injection lance needs to be switched to blow a slag conditioning agent into the gasification furnace before splashing the molten slag for protecting gasification furnace and performing maintenance and replacement of the particle material injection lance. The slag conditioning agent is used to adjust the composition and properties of the molten slag inside the gasification furnace In the "the organic substance solid phase particles blown from the particle material injection lance with a carrier gas jet are blown into the molten slag bath" mentioned above, the organic substance solid phase particles are one or more of waste plastic, waste rubber and rubber tires, agricultural solid waste, forestry solids waste, livestock and poultry manure, sweet sorghum biomass, agricultural straw, domestic waste, RDF, hazardous solid waste containing combustible components in the chemical industry, high sulfur coal, inferior coal, petrochemical residual combustible solid waste, etc.; and the mixture of the above organic substances and one or more of construction waste, inorganic solid waste, waste residue, sludge, inorganic salt, sewage, wastewater, etc. The particle size of the organic substance solid phase particles does not exceed 3 mm. The carrier gas is one or more of compressed air, nitrogen gas, water vapor, a gas containing VOCs, and a return gas of syngas.

The preferred solutions are as follows.

The apparatus further comprises a vaporization cooling flue, which is in communication with the upper part of the gasification furnace.

The apparatus further comprises a dust removal and heat recovery boiler, a gas inlet of the dust removal and heat recovery boiler being in communication with a gas outlet of the vaporization cooling flue.

The vaporization cooling flue has a vertical section directly above the gasification furnace, and the inner diameter of the vertical section is 1.3 to 2 times that of the gasification furnace.

The dust removal and heat recovery boiler is in communication with a bottom of the slag discharge and heat exchange shaft furnace through a gas return pipe. This gas return pipe is used to transport the cooled syngas, air and water vapor, to absorb sensible heat from the molten slag by reverse flow with the molten slag, to merge into new syngas produced by the gasification furnace, and to play a cooling effect on new produced primary syngas.

The gasification furnace is at least installed with one immersion oxygen lance capable of supplying an oxygen-containing gas gasifying agent and being immersed in the molten slag bath or the molten iron bath, which can inject oxygen gas, air, oxygen-enriched air, air or oxygen-enriched air preheated up to 1300° C. into the gasification furnace.

The nozzle position of the particle material injection lance is located 100-300 mm above the liquid level of the molten iron bath, and is immersed in the molten slag bath, the nozzle of the particle material injection lance is inclined downward at an angle of 40-60 degrees with the horizontal plane, the extended line of the nozzle intersects with the interface between the molten iron bath and the molten slag bath, and the distance from the intersection point to the geometric center of the interface between the molten iron bath and the molten slag bath does not exceed ½ of the geometric radius of the interface between the molten iron bath and the molten slag bath.

The sealing pressure-bearing mechanism includes a pressurizing chamber, a pressurizing inlet, a pressure relief port, and a sealing cover, wherein the pressurizing inlet, the pressure relief port and the sealing cover are respectively installed on the pressurizing chamber. It is worth noted that the specific installation positions of the pressurizing inlet, pressure relief port, and sealing cover are not limited, as long as they can achieve their respective functions. The sealing cover is installed as close to the molten iron pouring tank as possible to facilitate feeding materials.

A side wall of the liquid level adjusting furnace is installed with one immersion fuel injection lance capable of injecting an auxiliary slagging agent and being immersed in the molten slag bath or the molten iron bath, and also one immersion oxygen lance capable of supplying an oxygen-containing gas gasifying agent and being immersed in the molten slag bath or the molten iron bath.

The bottom of the slag discharge and heat exchange shaft furnace is also provided in communication with a slag-cooling sealing bucket, a slag-locking valve is provided between the slag-cooling sealing bucket and the slag discharge and heat exchange shaft furnace, and the bottom of the slag-cooling sealing bucket is provided with a valve.

From the above analysis, in view of the original process and unit operation, the present invention relates to the fields of the non blast furnace iron-making process of ironmaking and steelmaking. However, the present invention does not belong to the fields of the molten pool smelting of steel metallurgy or non-ferrous heavy metallurgy because the molten iron exists as catalyst without increasing or decreasing. The main function of the molten iron is to reduce and treat organic solid waste, including domestic garbage, biomass waste, waste plastic, etc. The present invention belongs to the fields of waste treatment of solid waste and hazardous waste in the environment protection industry. The produced CO-rich and hydrogen gas-rich syngas can be used as fuel and is more suitable to be used as raw material for chemical synthesis. It belongs to the fields of chemical synthesis and energy chemical industry.

The present invention comprises at least the following beneficial effects compared to the prior art:

The liquid level of the molten pool can be easily and quickly adjusted, which is beneficial to replacement and maintenance of the particle material injection lance: the maintenance, inspection, and replacement of the particle material injection lance are essential whether the end of the particle material injection lance is immersed in the molten slag bath or the molten iron bath. For this reason, it is necessary to be able to quickly and easily adjust the liquid level of the molten pool. The liquid level of the molten pool is lowered until the end of the particle material injection lance is exposed, and is continuously lowered until the radiant heat flow of the surface of the molten slag is reduced. The particle material injection lance can be integrally taken apart for inspecting, maintaining, and even replacing some of the burned and melted parts on the outside offline, and then maintained particle material injection lance can be replaced. The particle material injection lance can be turned on and constantly supply gas. At this time, the liquid level can rise to the set height, immersing the end of the particle material injection lance, and performing gasification operation.

When the liquid level is lowered to be lower than the end of the particle material injection lance, the gas supply can be stopped after the particle material injection lance is exposed, and the particle material injection lance will not be blocked, which reduces the temperature drop of the molten pool, saves heat, and saves unnecessary gas input. If the particle material injection lance is kept being immersed in the molten pool, the gas supply must be maintained. Even if organic materials are not blown for gasification, inert gas must be blown in and injected to prevent the particle material injection lance from being blocked by the molten slag and the molten iron. The liquid level is lowered until the particle material injection lance is exposed, which saves costs in the production gap, and also facilitates the replacement and maintenance of the particle material injection lance.

Non-water-cooling particle material injection lance can be used for safety and cost reduction under such operating conditions. For example, the innermost layer material injection pipe is made of wear-resistant steel materials having long lifetime, the outermost layer is made of refractory materials, and the middle layer is made of high thermal resistance insulation materials or is thermally insulated. The particle material injection lance can also be cooled by airflow. This particle material injection lance has low cost, simple structure, easy processing and maintenance. The middle layer and the outermost refractory materials can be repaired, processed and reassembled in the machine repair unit in the factory, so that the particle material injection lance can be regenerated and put into use again.

2. Hot-injecting-mending, slag-splashing for furnace protection, and timely maintenance and repair of furnace liner: the liquid level of the molten pool is lowered to a certain level, which is equivalent to emptying the entire molten iron bath in the gasification furnace, and leaving only the molten slag layer with a certain thickness. At this time, injecting a certain slag adjusting agent by the particle material injection lance, the smelting point and fluidity of the molten slag are adjusted to a certain extent. Then injecting the inert gas using a high-speed gas jet by the particle material injection lance or a top lance, the molten slag after slag adjustment is splashed by the momentum impact of the inert gas jet, and the molten slag is sprayed on the gasification furnace wall, and then slowly flowing down to form a layer of viscous slag for protecting the gasification furnace liner. This operation is similar to the slag-splashing protection furnace operation by nitrogen jet in the oxygen converter steelmaking process after the steel tapping is completed. The service life of the liner in the oxygen converter can thus reach tens of thousands of times, which greatly extends the service life of the oxygen converter.

3. Continuous molten slag discharge, physical sensible heat recovery of the molten slag, dust removal by high-temperature furnace gas: the slag overflows freely, and there is no need to open the slag outlet and interrupt the gasification operation for slag discharge. It not only absorbs the sensible heat of the molten slag, but also the new obtained syngas is cooled by introducing a part of the cooled syngas. Simultaneously, the diameter of the vaporization cooling flue is increased caused by the slag discharge and heat exchange shaft furnace, and the furnace gas speed is reduced, which is conducive to make the mechanically entrainment dust in coarse particles fall back into the gasification furnace. In addition, with the decrease of speed and increase of residence time, the cooling effect of the vaporization cooling flue is more significant, and the temperature of furnace gas is further reduced.

4. Sensible heat recovery of the furnace gas: hot steam is generated by the vaporization cooling flue and the dust removal and heat recovery boiler, which is supplied to dry the previous waste and biomass, so that the biomass furnace materials blown into the furnace and the water vapor conversion are used to adjust the H/C ratio of the syngas. Heat recovery has been effectively used, and overall energy efficiency has been further improved. Steam can be used to generate electricity. In areas lacking power supply, it can provide power support for power consumption in the factory such as crushing, mechanical extruding dehydration, and gas pressurization, etc. It can also supply power, heat, and steam to surrounding communities.

5. The end of the particle material injection lance can be inserted in the molten slag, and the jet can reach a certain depth inside the molten iron bath, which is beneficial to make full use of the pyrolysis effect of the molten iron bath on organic substances and the dissolving effect on carbon. The protection of the molten slag phase can be simultaneously used for oxidation of the gasifying agent, and does not cause too high oxidation loss of the molten iron droplets.

6. Secondary combustion is performed in the molten slag, instead of in the free space above the molten slag. Secondary combustion is performed by directly immersing in the molten slag, the combustion heat is directly absorbed by the furnace slag. The heat utilization rate is higher, and it is easy to transfer the heat to the molten iron for maintaining the temperature and heat balance of the molten pool.

Figure 1:
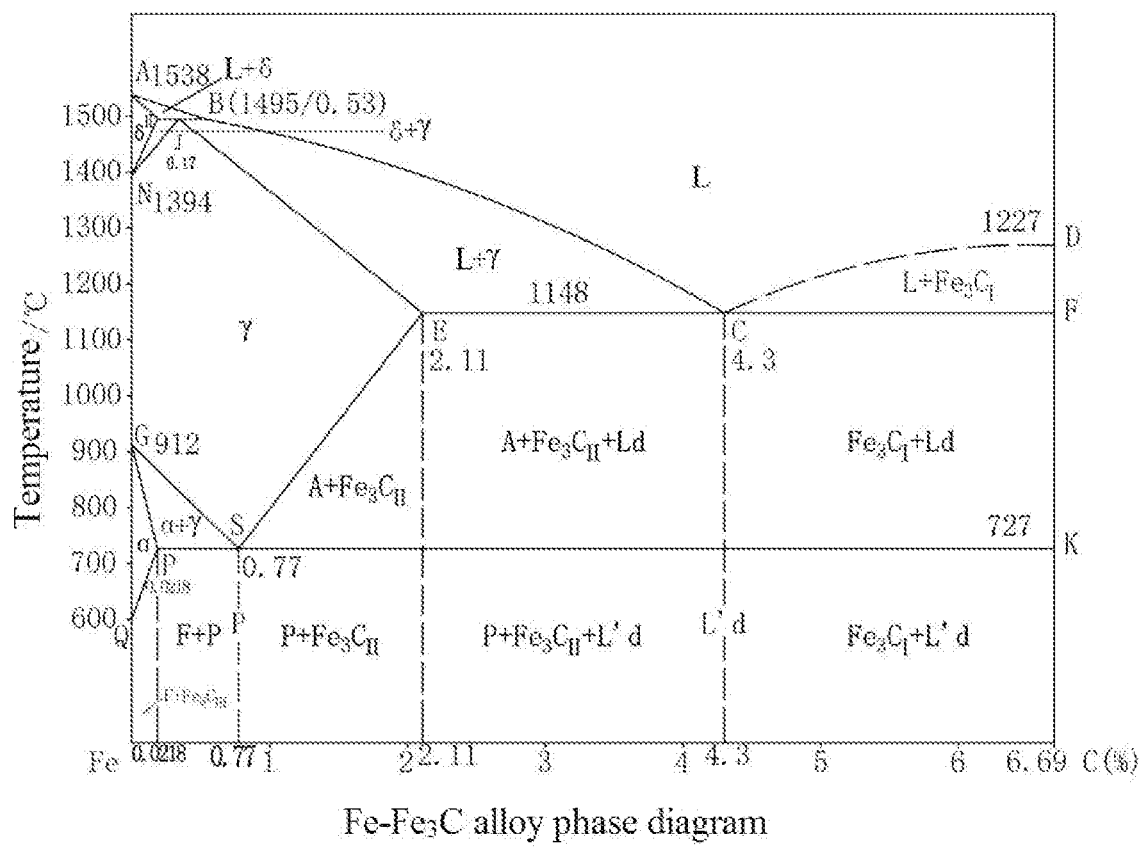
FIG. 1 is a binary alloy phase diagram of dissolved carbon in the molten iron.

In the drawings, 101: liquid level adjusting furnace, 102: pressurizing chamber, 103: pressurizing inlet, 104: pressure relief port, 105: sealing cover, 106: molten iron pouring tank, 107: tapping hole, 109: communication pipe, 113: a molten iron ladle, 131: immersion fuel injection lance, 132: immersion oxygen injection lance, 201: gasification furnace, 210: powder injection tank, 301: molten iron bath, 302: molten slag bath, 303: free space of the gasification furnace, 401: slag discharge and heat exchange shaft furnace, 402: slag-cooling sealing bucket, 403: slag-locking valve, 401: hot slag, 411: cold slag, 420: slag transport equipment, 501: vaporization cooling flue, 502: dust removal and heat recovery boiler, 7031: particle material injection lance, 7032: immersion oxygen lance, 901: new produced syngas, 902: cooled syngas, 903: heat-returning syngas, P1: internal pressure of the liquid level adjusting furnace, P2: internal pressure of the gasification furnace, h1: molten iron bath liquid level relative to the bottom of the liquid level adjusting furnace in the initial and maintenance state, h2: the molten iron bath liquid level of the liquid level adjusting furnace in the gasification state, h3: the molten iron bath liquid level of the gasification furnace relative to the bottom of the liquid level adjusting furnace in the gasification state.

DETAILED DESCRIPTION OF EMBODIMENTS

The present invention will be described in further detail with reference to the embodiments and the accompanying drawings below.

Embodiment 1

Organic substance particles are blown into the molten iron bath and the molten slag bath at high speed, the hydrocarbons in the organic substances are rapidly performed thermal pyrolysis, the C—C chains and C—H chains are decomposed, the hydrogen atoms are combined into hydrogen gas molecules, and the carbon is dissolved in the molten iron. The carbon content dissolved in the molten iron is between 3-5%, which greatly reduces the smelting point of the Fe—C alloy. The iron-carbon alloy melt with 4.3% carbon content has a smelting point as low as 1148° C., as shown in the Fe—C phase diagram of FIG. 1. The iron-based alloy can be maintained as a liquid melt above 1250° C. in the industry, which not only reduces heat loss, but also guarantees the extension of the service life of the furnace liner and the injection lance. The pyrolysis and gasification of organic compounds have been relatively thorough at this temperature. Considering smelting point and fluidity of the molten slag liquid comprehensively, it is generally more advantageous to control the temperature of the molten pool at 1350-1600° C. in order to discharge the molten slag in the liquid state.

Figure 2:
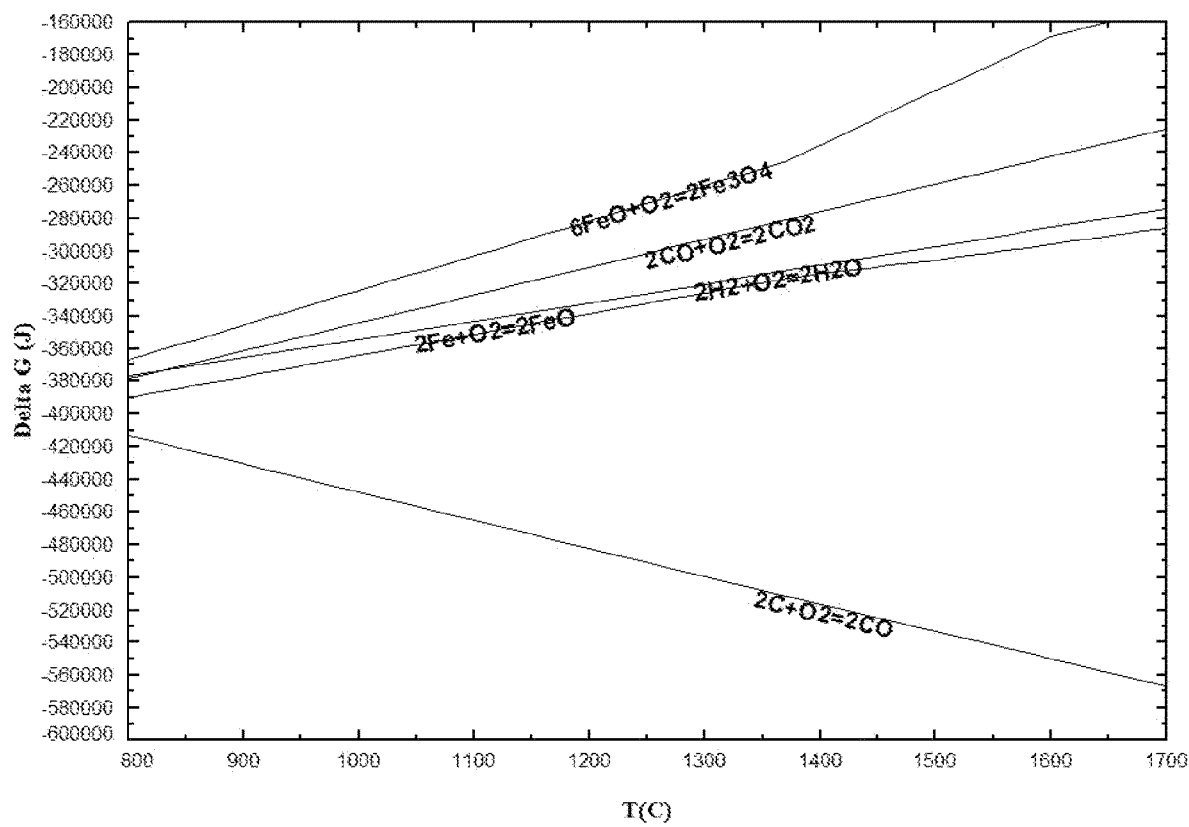
FIG. 2 is an oxidation sequence drawing of C, H and Fe elements.

The molten pool where a large amount of liquid molten iron exists provides an excellent catalyst for the gasification of organic substances. Gasification is different from combustion. Combustion is fully oxidized and completely oxidized, and oxygen is generally slightly excessive. Gasification is also different from thermal pyrolysis. Thermal pyrolysis is anaerobic and does not require oxygen as much as possible. Gasification is an incompletely oxidized semi-oxidation and semi-reduction process. The existence of a large amount of molten iron not only acts as a transfer medium for oxygen and carbon, but also CO gas is obtained only without over-oxidized $CO_2$ due to reducibility of the iron. FIG. 2 shows free energy change of the oxidation reaction of the main elements C, H, and Fe from organic substance gasification in the molten iron bath and the molten slag bath, and is similar to the Ellingham diagram used by the Institute of metallurgical physics and chemistry. As shown in the FIG. 2, in the standard state, when oxygen is introduced into the molten iron bath, the dissolved carbon and solid carbon will be preferentially oxidized to generate CO gas. Only when the carbon content is reduced to a very low level, preferential oxidation of iron will occur. Oxygen is blown into the molten iron bath, and reacts with iron to form FeO. Dissolved oxygen is released to a certain extent in the dynamic equilibrium, and reacts with dissolved carbon. The reaction speed and transfer process are 1-2 orders of magnitude faster than the speed of solid carbon and gaseous molecular oxygen.

Thermal balance is a key of the gasification process in the molten iron bath and the molten slag bath. In many chemical and physical processes, only incomplete oxidation of carbon to form CO gas is an exothermic process, as the reaction equation (1). Many other processes, especially at high temperature of the molten pool heated to 1350-1600 degrees Celsius, such as the pyrolysis and heating of organic materials, the gasification and evaporation of water, the heating process of water vapor, the heating process of introduced oxygen, the heating process of lime-based additives, and the gasification process in which water vapor reacts with carbon, as the reaction equation (2), are endothermic processes.

Gasification of organic substance of higher calorific value which has higher total carbon content and lower moisture, ash, and oxygen, can achieve thermal equilibrium. Almost all carbon atoms can be transferred to gas-phase CO, and all hydrogen elements can be transferred to gas phase $H_2$. High yield of syngas can be achieved. Even due to the high carbon content and low water content, the heat release obtained according to the reaction equation (1) causes the entire molten pool overheated. A certain amount of water vapor, carbon dioxide gas, air, atomized water-containing air or oxygen-enriched air, iron ore and other metal oxides as gasification agents need to be added for cooling the molten pool. In this case, the proportion of hydrogen gas in the syngas is increased, the total gas production is increased, and the calorific value of the syngas is correspondingly increased due to the reaction equation (2).

In many cases, organic substances with low calorific value such as biomass and domestic waste, contain high amount of moisture, and even combined water and compound of hydrogen and oxygen are introduced into the ultra-high temperature dual molten bath. Gasification, vapor heating, and vapor gasification of dissolved carbon of combined water and compound of hydrogen and oxygen are performed according to the characteristics of water. This triple endothermic effect is very large, most of the carbon elements are gasified according to reaction equation (2), and only a small amount of carbon is gasified according to reaction equation (1) because of high O/C ratio and H/C ratio in such organic substances. The heat released by the reaction is severely insufficient, so that the temperature of the molten pool is severe decreased and the gasification process cannot be performed continuously. At this time, thermal compensation needs to be performed in the following ways: A, introducing pure oxygen or preheated oxygen-enriched air, for example, preheating oxygen-enriched air containing oxygen gas more than 40% to 1100-1300 degrees Celsius by a hot blast stove. This is a common practice in blast furnace of ironmaking and steelmaking.

B, drying materials as early as possible to reduce moisture, or effectively drying materials by physical sensible heat of the produced high-temperature syngas.

C, using preheated CaO-based auxiliary slagging agent instead of $CaCO_3$-based auxiliary slagging agent. The latter has a large molecular weight, needs to absorb heat during thermal pyrolysis, and the gasification process is endothermic reaction using released $CO_2$ as a gasifying agent. The reduced heat consumption is not very significant because the total amount of slagging agent is not very large.

D, blending other combustibles with high calorific value, such as pulverized coal, industrial waste plastics, waste rubber tires, for increasing apparent calorific value of furnace materials.

E, increasing the secondary combustion rate. As shown in reaction equation (4), when I mol carbon and oxygen are fully oxidized, heat energy of 394.1 kJ is released. The incomplete oxidation of carbon to form CO only releases heat energy of 110.4 kJ, which is equivalent to only 28%, and the remaining 72% heat energy is reflected in the secondary combustion embodied in reaction equation (3). A large amount of thermal energy can be released and the temperature of the entire molten pool can be maintained constant by introducing an appropriate amount of excess oxygen for secondary combustion, that is, oxidation degree of the syngas is increased.

$$C + \frac{1}{2}O_2 = CO\_\Delta H = -110.4 \text{ kJ/mol}. \quad (1)$$

$$C + H_2O = CO + H_2\_\Delta H = 135.0 \text{ kJ/mol}. \quad (2)$$

$$CO + \frac{1}{2}O_2 = CO_2\_\Delta H = -283.3 \text{ kJ/mol}. \quad (3)$$

$$C + O_2 = CO_2\_\Delta H = -394.1 \text{ kJ/mol}. \quad (4)$$

Figure 3:
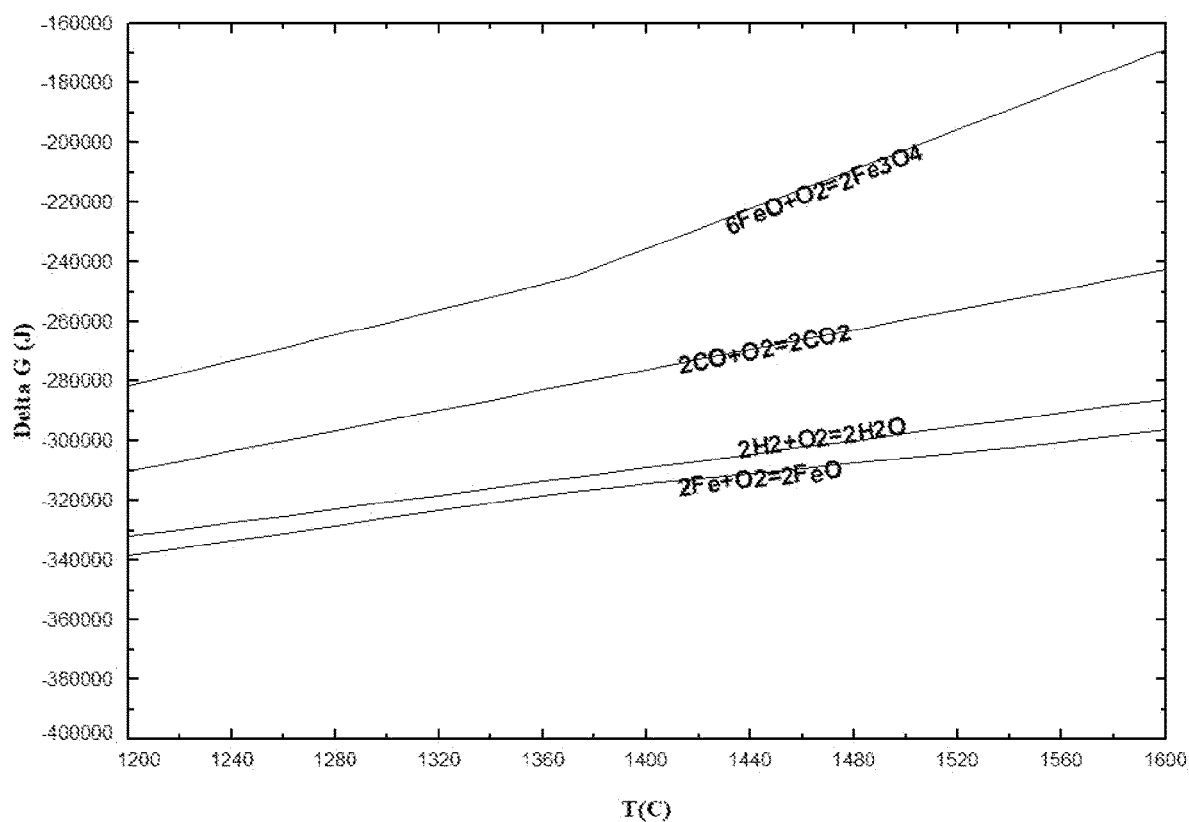
FIG. 3 is a priority oxidation sequence drawing of secondary combustion.

FIG. 3 clearly displays a part of FIG. 2. It can be seen that during the secondary oxidation of CO gas, if the oxygen firstly contacts the molten iron, the molten iron is preferentially oxidized instead of CO gas. Therefore, the oxygen gas should be preferentially blown from the molten slag bath during the secondary oxidation. Oxygen for secondary oxidation is blown from the molten slag bath or the free space as much as possible for physically isolating from a large amount of the molten iron, and heat is transferred from the thicker molten slag layer or foamed slag to the entire molten pool. Therefore, the insertion position of the injection lance for the secondary oxidation is generally on the side wall or the top, and the outlet of the immersion oxygen lance is immersed above the molten slag bath 302 or above the liquid level over the molten slag bath. The secondary combustion rate is generally in the range of 15-50% according to the calorific value of the material, the total carbon content, and corresponding O/C ratio. In view of this, it is necessary to cover a layer of molten slag bath on top of the molten iron bath in order to form a dual molten bath of the molten iron bath and the molten slag bath.

Figure 4:
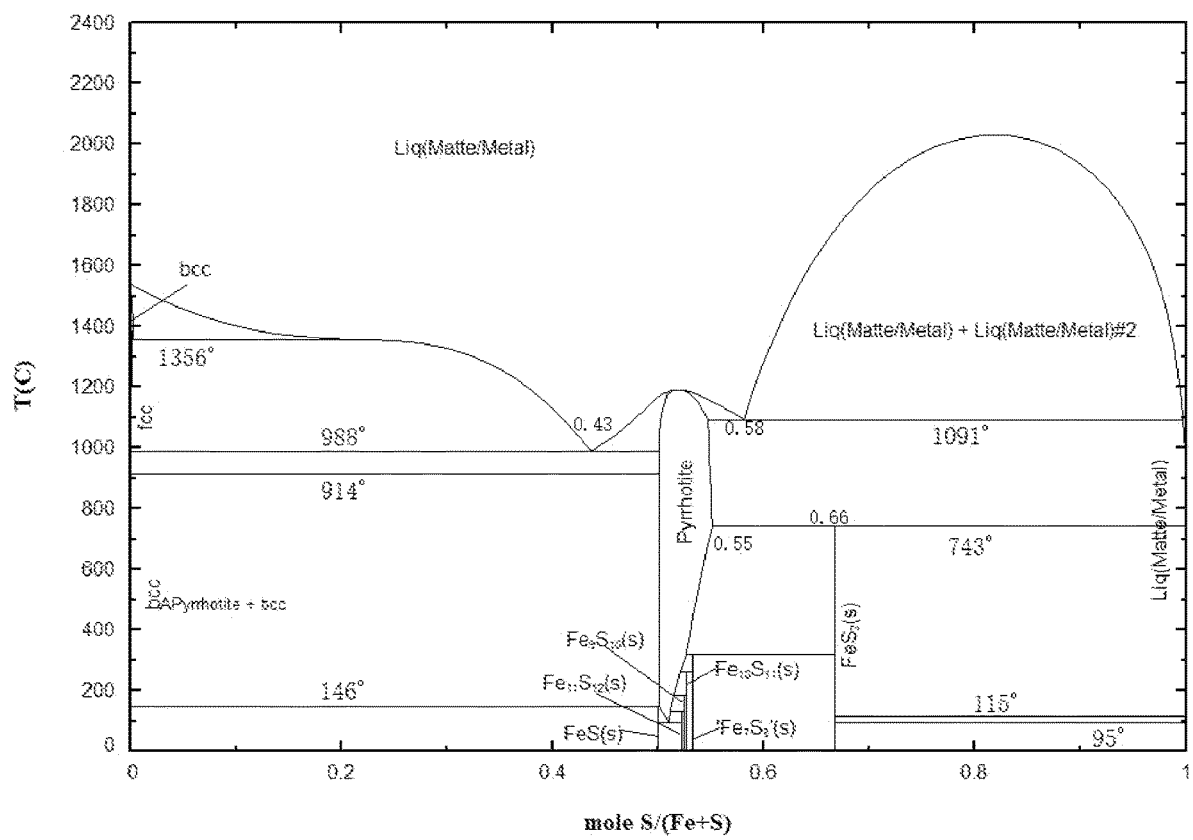
FIG. 4 is a binary alloy phase diagram of dissolved sulfur in the molten iron.

Another advantage of the molten iron bath is the absorption and removal of sulfur. Both coal and petroleum industry solid waste often have high sulfur content. The molten iron bath can absorb sulfur quickly, so that the $H_2S$ content in the gas phase is very low, and even the syngas and subsequent combustion processes do not need special desulfurization. For example, the sulfur content in the syngas is less than 30 $mg/NM^3$, because iron very easily reacts with S to obtain FeS, and FeS with high concentration can be dissolved in the molten iron, as shown in the Fe—S phase diagram in FIG. 4.

Figure 5:
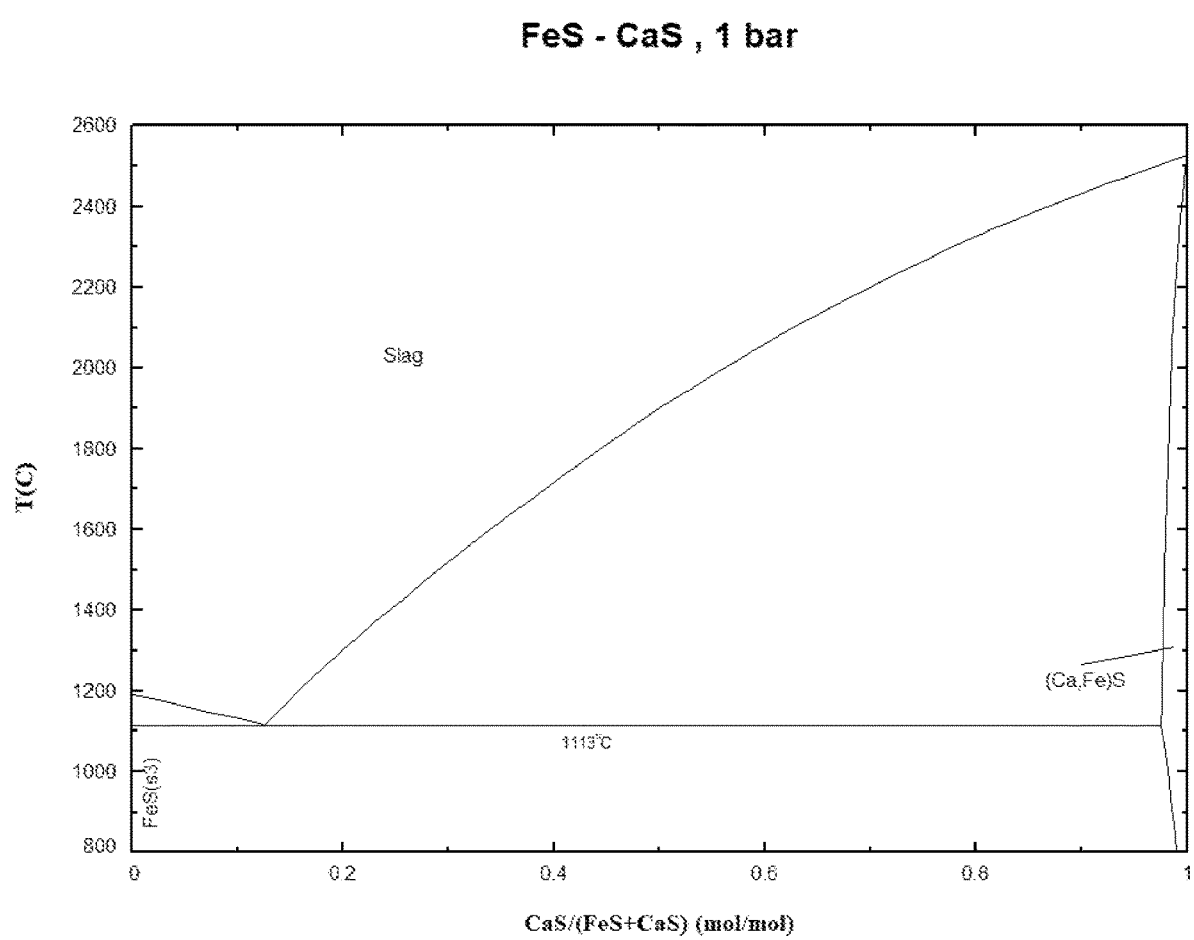
FIG. 5 is a state drawing of CaS dissolved in the molten matte.

Although the sulfur element in the organic substances blown into the molten iron bath can be instantly solidified in the molten iron by the molten iron, in the present invention, the molten iron exists as a catalyst medium. Theoretically, it is "no produced, not destroyed, not defiled, not pure, not increased, and not decreased", and does not used for synergistic treatment of organic solid waste in the iron-making process. The long-term accumulation of S element in the molten iron is unsustainable. The CaO-based auxiliary slagging agent is blown into the furnace for desulfurization. FeS reacts with CaO to obtain CaS which forms a low-smelting sulfide phase with FeS. As shown in FIG. 5, CaS is finally dissolved in the highly basic oxide multi-component slag system, the ash content in organic substances causes that the amount of slag to be continuously increased, and the slag containing CaS is regularly discharged or continuously overflows to be removed.

The organic substances to be gasified that are blown into the furnace contain high amount of chlorine elements because waste plastic and domestic waste often contain polyvinyl chloride (PVC). Chlorine element is combined with H to obtain HCl gas during the gasification process in the molten iron bath. If excessive CaO-based auxiliary slagging agent is blown simultaneously, $CaCl_2$ can be obtained. Most of which is dissolved in the molten slag, and a small amount is volatilized into the furnace gas, which is subsequently collected as dust during cooling process. These chlorine elements that is similar as inorganic salt has no corrosion and health hazards to the apparatus and the environment.

Heavy metals in domestic waste and solid waste, such as lead, zinc, and cadmium, can be directly volatilized into the gas phase during the gasification in the molten iron bath, and then condensed and collected, and their chlorides and oxides can be reduced by the carbon dissolved in the molten iron to obtain metal steam entering the gas phase. Subsequent products in the condensation and collection process can be used as by-products to be provided to non-ferrous metal smelting enterprises.

Non-volatile heavy metals, such as copper and nickel, directly enter the molten iron without affecting the function of the molten iron bath.

The potassium and sodium elements in organic solid wastes are converted into potassium and sodium chlorides and oxides during the gasification process in the molten iron bath, which are volatilized along with the furnace gas, enter the dust during cooling process, and can be used as agricultural fertilizer raw materials after collecting.

Results of detailed chemical composition and elements during the gasification in the molten iron bath and the molten slag bath are shown as in the table 2.

TABLE 2 chemical reaction analysis of various elements and components
from complex organic substances during the gasification in the dual molten bath

| Chemical composition | Main chemical reaction | Finally results — No secondary combustion | Finally results — Having secondary combustion |
|---|---|---|---|
| Fixed carbon | $C \xrightarrow{Molten\_Fe} [C]$ <br> $[C] + [O] \to CO$ | CO in syngas | CO and $CO_2$ gas products |
| Volatile compostion | $C_nH_{2m} \xrightarrow{Molten\_Fe} n[C] + mH_2$ <br> $[C] + [O] \to CO$ | CO and $H_2$ in syngas | CO, $CO_2$, $H_2$ and $H_2O$ gas products |
| Moisture content | $(x + y)H_2O + xFe \to xH_2 + xFeO + yH_2O$ | $H_2$ in syngas | $H_2$ and $H_2O$ gas products |
| Iron oxides | $Fe_xO_y + y[C] \to x[Fe] + yCO$ | Staying in molten iron bath, rarely in the molten slag bath | Staying in molten iron bath, small amount in the molten slag bath |
| Ash content | $CaO + MgO + SiO_2 + Al_2O_3 \to$ <br> $(CaO - MgO - SiO_2 - Al_2O_3)$ | Forming slag | Forming slag |
| S element | $S + [Fe] \to FeS$ <br> $FeS + CaO = [Fe] + [O] + (CaS)$ | CaS fixed in molten slag | CaS fixed in molten slag |
| Nitrogen-containing organic substances | $(-NH_2)_2 \to N_2 + 2H_2$ <br> $(-NO_x)_2 \xrightarrow{Molten\_Fe} N_2 + 2x[O]$ | $N_2$ in gas phase | $N_2$ in gas phase |
| F and Cl elements | $Cl + [Fe] \to (FeCl_2)$ <br> $(FeCl_2) + (CaO) \to (CaCl_2) + (FeO)$ <br> $CaF_2 \to (CaF_2)$ | Some in the molten slag and the rest in dust | Some in the molten slag and the rest in dust |
| K and Na elements | $K_2O \to (K_2O) \to K_2O \uparrow$ <br> $KCl + (CaO) \to (CaCl_2) + K_2O \uparrow$ <br> $Na_2O \to (Na_2O) \to Na_2O \uparrow$ <br> $NaCl + (CaO) \to (CaCl_2) + Na_2O \uparrow$ | Some in the molten slag and the rest in dust | Some in the molten slag and the rest in dust |
| Pb, Zn, Cd heavy metals and their compounds | $mZn + nZnO + n[C] = (m + n)Zn \uparrow + nCO$ <br> $ZnCl_2 + CaO + C \to CO \uparrow + Zn \uparrow + CaCl_2$ <br> $(m + n)Pb \to mPb \uparrow + nPb(liquid) \downarrow$ <br> $Cd \to Cd \uparrow$ | Recovery metal after condensation in gas phase | Recovery metal of lead and cadmium after condensation in gas phase Partial oxidation of zinc in dust |
| P element | $Pb \to [P]$ <br> $[Pb] + [O] \to (P_2O_5)$ | Element in the molten iron | Element in the molten iron, some oxides in the molten slag |
| Cu, Ni heavy metals | $Cu \to [Cu]$ <br> $Ni \to [Ni]$ | Element in the molten iron | |
| Cr and Mn metals | $Mn + Mn_xO_y + y[C] \to (1 + x)[Mn] + yCO$ <br> $Cr + Cr_xO_y + y[C] \to (1 + x)[Cr] + yCO$ | In molten iron | in the molten iron, some oxides in the molten slag |
| Waste Al and Mg | $2[Al] + 3[O] \to (Al_2O_3) + \Delta H$ <br> $Mg + 2[O] = (MgO) + \Delta H$ | oxides in the molten slag | oxides in the molten slag |

Organic solid waste conversion in the molten iron bath is suitable for a variety of organic solid wastes, even suitable for organic-inorganic mixed solid waste. Solid wastes that can be treated and converted include but are not limited to: (1) raw coal, high sulfur coal, inferior coal, low-rank coal, coal slime and coal gangue; (2) organic solid waste, organic hazardous waste; (3) oil sludge, sludge and unusable solid waste in petrochemical industry; (4) waste plastics and rubber tires; (5) mixed waste containing low-cost C and H elements with certain combustible value; (6) agricultural straw, agricultural processing solid waste and sweet sorghum straw in biomass; (7) forestry processing sawdust, forestry branches, palm shells and other forestry solid wastes; (8) solid waste from livestock and poultry manure, fishery and animal husbandry, and aquaculture; (9) domestic waste by moderately dry, RDF, etc. (10) organic gas containing VOCs, (11) multiphase organic waste with a small amount of mixed sewage and unwieldiness wastewater.

Figure 6:
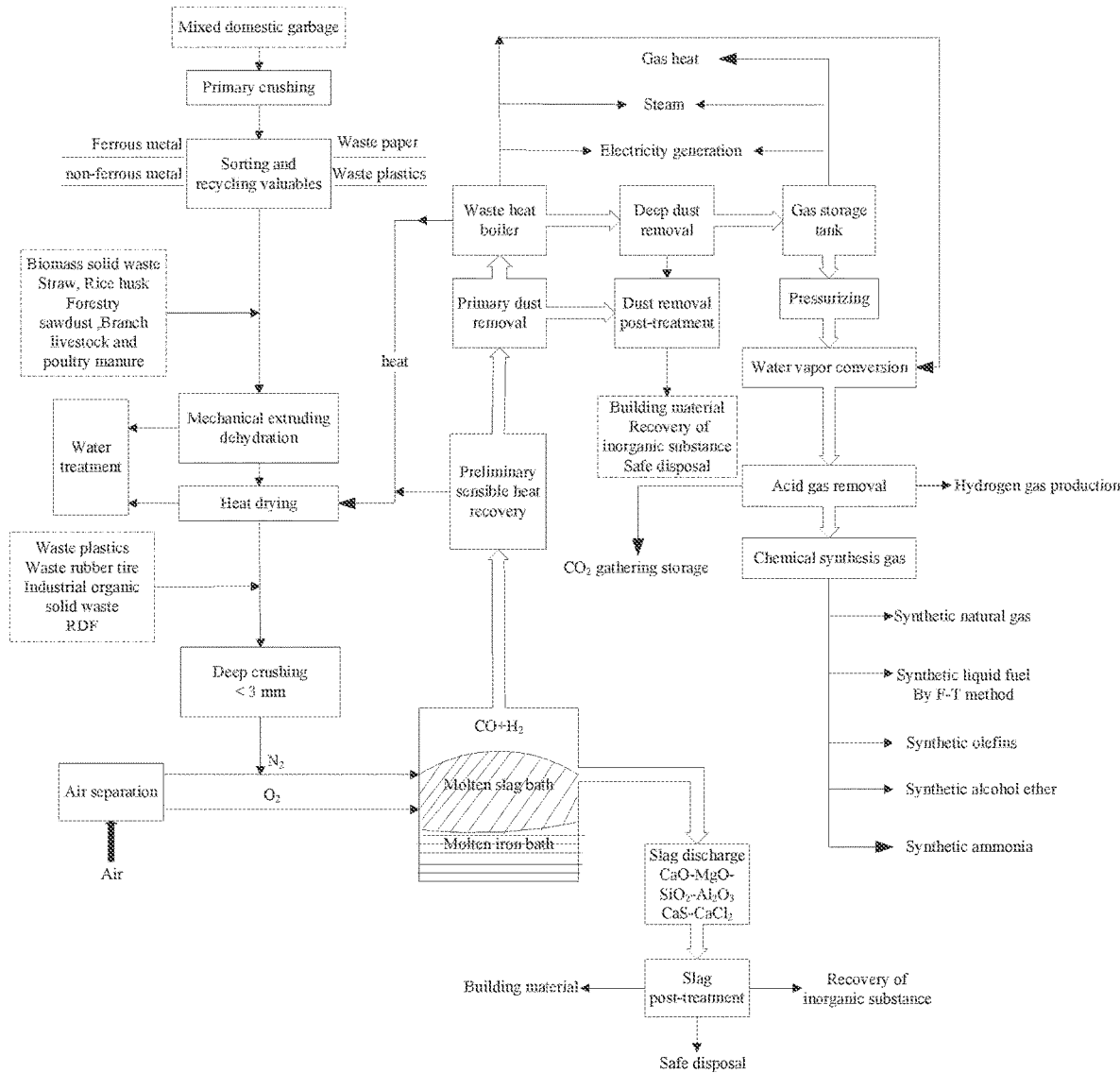
FIG. 6 is an overall gasification process flowchart of complex organic substance solid waste.

FIG. 6 is an overall flowchart of clean energy conversion of all human domestic waste and industrially discharged organic waste in the molten iron and the molten slag bath. Mixed waste from complex sources, are subjected to several times of sorting, separation, and recyclable ferrous metal (magnetic/non-magnetic), non-ferrous metal (heavy metal/light metal), glass, waste paper, waste plastic (PE/PVC/PP/PS/ABS, etc.) are separated for regenerate resources. The rest that cannot be directly used as materials are subjected to several times of breaking, crushing, mechanical extrusion dehydration, drying (preferentially using the sensible heat of produced syngas by the gasification furnace or recovered steam heat), transmitted into powder injection tank, formulated with certain CaO-based slagging agent according to the amount of elements such as sulfur, chlorine and fluorine, and injected into the molten iron and molten slag bath. At the same time, oxygen gas gasifying agent, pre-heated oxygen-enriched air, water vapor, etc. are introduced, and gasifying agents for cooling such as water vapor or atomized water-containing gas are formulated according to the thermal equilibrium of the molten pool. Further, usually oxygen gas or preheated oxygen-enriched air oxidizer of the secondary combustion are additionally introduced, to obtain syngas similar to water gas with certain oxidation degree, which almost contain no $CH_4$, $H_2S$ and other gases. The main active ingredient CO and $H_2$ accounts for more than 99% of all combustible gases. The syngas is cooled and dedusted, sensible heat is recovered at the same time to produce steam, and the produced syngas is used in the next step.

Syngas after purifying and cooling can be directly burned as a heat source, such as the fuel for iron-making hot stoves in ironmaking and steelmaking, fuel of baking ladle, metal magnesium reduction, metal smelting, heating, living, etc. It is usually used as a natural gas substitute to enter a boiler to produce water vapor or hot water, and used for gas turbine power generation, water vapor turbine power generation, or IGCC combined cycle power generation. At the same time, it can not only be used for producing industrial hydrogen, but also providing raw materials for synthetic ammonia by adjusting the H/C ratio by water vapor conversion.

Further applications are chemical synthesis, such as preparing natural gas, producing fuel oils by Fischer-Tropsch Synthesis, such as gasoline and diesel fuel, paraffin oil, naphtha, or producing olefins, polyolefins, synthetic alcohol ethers and other chemical products.

Waste containing organic substances and solid waste can be converted into syngas rich in CO and $H_2$ by the molten iron bath conversion. Downstream extension products and applications by adjusting H/C ratio by water vapor conversion include but are not limited to: (1) heat energy of gas, (2) heat energy of water vapor; (3) electric power generation; (4)hydrogen gas; (5) synthesis of artificial natural gas; (6) Fischer-Tropsch Synthesis products such as gasoline and diesel fuel, lubricant oil, naphtha, etc.; (7) synthesis of methanol, ethanol, ethylene glycol, dimethyl ether, and olefins, aromatics, polyolefins and other products that is originally depended on petrochemicals.

It can be seen that organic substances of most of the organic solid wastes or organic-inorganic mixed solid wastes can be effectively converted into carbon-syngas by the dual molten bath of the molten iron and the molten slag, and raw material source is in wide spectrum and universal.

Embodiment 2

The embodiment will be described with reference to FIG. 7, FIG. 8 and FIG. 9.

A liquid level adjusting furnace 101 is in communication with the bottom of a gasification furnace 201 through a communication pipe 109, and the upper part of the liquid level adjusting furnace 101 is in communication with a molten iron pouring tank 106. The molten iron which has been pre-melted at a temperature of 1200-1700° C. is charged into a molten iron ladle 113, the molten iron is poured into the molten iron pouring tank 106 from the molten iron ladle 113, and the molten iron flows into the liquid level adjusting furnace 101. As the amount of the molten iron gradually increases, the communication pipe 109 is also filled with the molten iron, and the liquid level is gradually increased to the bottom of the gasification furnace 201.

After the amount of the molten iron reaches a predetermined amount, part of the molten slag entrained in the molten iron floats above a molten iron bath 301 of the liquid level adjusting furnace 101 and a molten iron bath 301 of the gasification furnace 201, respectively, and forms a molten slag bath 302 floating on the molten iron bath 301. A part of the prepared slag materials are blown from a particle material injection lance 7031 on the side wall of the gasification furnace 201, and protective slag is simultaneously blown from an immersion fuel injection lance 131 on the side wall of the liquid level adjustment furnace 101 for heat preservation of the molten iron.

At this moment, internal pressure P1 of the liquid level adjusting furnace 101 and internal pressure P2 of the gasification furnace are local atmospheric pressures, the liquid levels are flat, and the liquid level of the molten iron bath is h1 relative to the bottom of the liquid level adjusting furnace. This is a ready state, as shown in FIG. 8.

When starting injecting materials for gasification operation, pressurizing operation is performed. The molten iron pouring tank 106 is placed inside a sealable pressurizing chamber 102. The opening of the pressurizing chamber 102 is used for filling the molten iron. After filling the molten iron, it can be sealed with a sealing cover 105, and able to withstand pressures exceeding several atmospheres from the inside. Compressed air, nitrogen gas, and other gases is introduced from a pressurizing inlet 103 so that internal pressure P1 of the pressurizing chamber 102 is increased above one atmosphere, and continuously increased. Although the molten iron pouring tank 106 may have a baffle to prevent the heat in the furnace from radiating outward, it does not prevent the transmission of gas pressure. The pressure of the upper space of the liquid level adjusting furnace 101 and the pressure of the pressurizing chamber 102 tend to be consistent and reach P1. At this time, because P1 is larger than P2, the liquid level of the molten iron bath 301 in the gasification furnace rises, and the liquid level of the molten slag bath 302 above it also rises accordingly. After the liquid level reaches the set height, the pressurizing inlet 103 stops pressurizing, and maintains this pressure. In the subsequent operations, the internal pressure of the pressurizing chamber 102 is monitored. If the internal pressure is lower than the set value, the pressurizing inlet 103 is opened for pressurizing operation. If the internal pressure is higher than the set pressure, the pressure relief port 104 is opened for relief operation to restore the set pressure.

During normal gasification operation, the pressure P2 of the gasification furnace can be set to 0.13-0.20 MPa, and the corresponding pressure P1 is set to 0.20-0.30 MPa. The pressure difference between the two determines the height difference of the molten iron levels in the two furnaces.

$$P_1-P_2=\rho g(h3-h2)$$

where ρ is the density of the molten iron. The density of the molten iron with higher carbon content is about 6800-7000 kg/M³. The liquid level difference between the two furnaces can be calculated to be about 1.4-1.5 m if the pressure difference is 1 atm.

The above calculation is based on molten iron. If the influence of slag density is considered, the thickness of the slag layer on both sides needs to be considered for more accurate calculation. In fact, the slag layer in the gasification furnace 201 tends to be a little thicker, but the slag layer in the gasification furnace 201 is always in the foaming state during the gasification process. Although the slag layer is thicker, the actual density of the slag layer is lower than that of conventional static slag layer. The static pressure difference between the two parts of the slag layer is negligible in the calculation process that is not particularly accurate.

The interface between the molten iron bath 301 and the molten slag bath 302 in the gasification furnace 201 is set to have a certain distance below the particle material injection lance 7031 on the side wall of the gasification furnace. This setting not only ensures that the lower end of the particle material injection lance 7031 is not immersed in the molten iron bath 301, but also ensures that the powder jet blown diagonally downward by the particle material injection lance 7031 can penetrate the molten slag layer and reach a certain depth of the molten iron bath for better contacting the molten iron for gasification or carbon dissolution. The lower port of the particle material injection lance 7031 can be empirically set 200-300 mm away from the interface of static molten iron-molten slag.

Before the particle material injection lance 7031 and an immersion oxygen lance 7032 are immersed in the molten slag bath 302, the both have been blown with an inert gas such as nitrogen gas. It is a basic principle that all injection lances shall be blown with inert gas in advance before being immersed in the molten pool to prevent the melt from flowing backward and being solidified to clog the injection lance. Similarly, the immersion fuel injection lance 131 and immersion oxygen lance 132 on the side wall of the liquid level adjusting furnace 101 also need to implement this principle.

With the start of the gasification operation, the particle material injection lance 7031 and the immersion oxygen lance 7032 immersed in the molten slag bath 302 begin to work. Organic solid waste particles that have been dried and broken to less than 3 mm are packed in the powder injection tank 210. After the valve is opened, the particles along with carrier gas nitrogen gas jet is blown into the molten slag by a particle material injection lance 7031, penetrates the molten slag bath 302 and is blown into the molten iron bath 301 under the action of strong dynamic energy of gas jet. The blown organic solid waste particles are in contact with the ultra-high temperature molten slag bath 302 and the molten iron bath 301, and cracked and pyrolyzed by instant absorption of heat. Then the hydrogen elements combine into hydrogen molecular bubbles and float up, and the carbon elements are dissolved in the molten iron bath 301, which increases the carbon content of the molten iron. In order to ensure that the jet can penetrate the molten slag and reach the molten iron, the nozzle of the particle material injection lance 7031 is inclined downward at an angle of 40-60 degrees with the horizontal plane. The extended line of the nozzle intersects with the interface between the molten iron bath 301 and the molten slag bath 302, and the distance between the intersection point and the geometric center of the interface between the molten iron bath 301 and molten slag bath 302 does not exceed ½ of the geometric radius of the interface between the molten iron bath 301 and molten slag bath 302.

At the same time, the immersion oxygen lance 7032 is also switched to a normal state in which it provides gasifying agent from a ready state in which it has a temporary function of injecting nitrogen gas to prevent jams. Gasifying agents may be selected from a group including pure oxygen, pre-heated oxygen-enriched air, oxygen-enriched air, preheated air, air, and water vapor, atomized water, and carbon dioxide gas that may be added to the main gasifying agent mentioned above, among which the pure oxygen is the most beneficial for the gasification process and produced gas components, followed by preheated oxygen-enriched air. Water vapor, atomized water, and carbon dioxide gas cannot be used as the main gasifying agents, and can only be used as auxiliary gasifying agents to cool the molten pool when the molten pool is overheated.

For example, the gasifying agent blown by the immersion oxygen lance 7032 is pure oxygen. The immersion oxygen lance 7032 and the particle material injection lance 7031 are arranged at a certain angle, a certain vertical interval, and a certain inclination angle with the horizontal plane. The immersion oxygen lance 7032 can also be arranged with the particle material injection lance 7031 as a concentric multilayer casing type.

Pure oxygen jet is blown into the molten slag bath 302 by the immersion oxygen lance 7032, reacts with the iron droplets mixed in the molten slag to obtain FeO which dissolves in the molten slag and the molten iron, and releases oxygen atoms that reacts with dissolved carbon in the molten iron to perform a carbon-oxygen reaction at a rate 1-2 orders of magnitude faster than the rate at which solid carbon particles react with oxygen molecules. A large amount of CO bubbles are generated, which is together with the $H_2$ bubbles to stir the upper part of the molten iron bath 301 and the entire molten slag bath 302 to form a state where the center similar to a "bubbling spring" rolls around, and then form furnace gas mainly containing CO and $H_2$ which escapes the molten pool and flows upward, and mechanically entrains a part of the molten slag and the molten iron particles.

Organic solid waste contains a certain amount of inorganic ash. Mixed solid waste, such as garbage, also contains inorganic substances that cannot be gasified. These inorganic substances enter the molten slag bath 302 and become part of the molten slag. As the gasification process of materials in the furnace are performed, the amount of the molten slag bath 302 continues to increase. It is always in a relatively high degree of bubblizaiton and its volume expands when the molten slag bath 302 is stirred by the furnace gas. When the total amount and expansion rate make the height of the molten slag bath 302 exceed the cofferdam at the connection between the slag discharge and heat exchange shaft furnace 401 and the gasification furnace 201, the overflowed molten slag flows into the slag discharge and heat exchange shaft furnace 401, and is solidified into hot slag 410 in a solid state. The slag discharge and heat exchange shaft furnace 401 is filled with discharged slag from bottom to top. The lowermost cold slag 411 has a low temperature of 100-150° C., and the uppermost hot slag 410 just introduced in has a temperature as high as 1400-1500° C. The heat exchange medium is cooled syngas 902, or mixed with a certain amount of air, which is blown from the bottom of the slag discharge and heat exchange shaft furnace 401 after pressurizing, becomes a heat-returning syngas 903 after absorbing sensible heat of the hot slag, and enters a free space of the gasification furnace 303 from an upper portion of the slag discharge and heat exchange shaft furnace 401, which is similar to a gas-solid heat exchanger of a fixed bed.

The slag that is cooled by gas heat exchange is periodically discharged to the underlying slag-cooling sealing bucket 402 for accumulation without affecting the pressure of the cooled syngas 902 through the slag-locking valve 403 below the slag discharge and heat exchange shaft furnace 401. The slag is periodically discharged to the slag transportation equipment 420 through a valve below the slag-cooling sealing bucket 402, and is transported to a special slag processing site for post-processing. Inorganic materials are subjected to iron and iron oxide recovery, inorganic salt recovery or disposal, building materials utilization, harmless disposal, etc. according to properties and environmental safety.

New produced syngas 901 escapes the molten pool at a temperature of up to 1400-1500° C., carries a certain amount of solid-liquid phase impurities, flows upward, and is mixed with the heat-returning syngas 903. The temperature of overall furnace gas decreases because the temperature of the heat-returning syngas 903 is significantly lower than the new produced syngas 901. At the same time, the diameter of the free space of the gasification furnace 303 includes the partial diameter of the slag discharge and heat exchange shaft furnace 401. The diameter of the free space of the gasification furnace 303 is increased significantly, flow rate of the furnace gas is decreased, and the momentum is decreased. Partial dust and droplets fall down on the side wall. A vaporization cooling flue 501 is arranged at the side wall and top of the free space of the gasification furnace 303, which can absorb the heat of the furnace gas to a certain extent and further reduce the temperature of the furnace gas. The speed and the content of the dust are further decreased.

When the furnace gas enters the dust removal and heat recovery boiler 502, the temperature may have dropped to 800-1100° C. Typically, when the temperature is less than 1000° C., cyclone dust removal is performed directly to remove some large particles of dust and slag. Then the furnace gas enters the dust removal and heat recovery boiler to exchange heat and produce superheated steam. When the furnace gas is further cooled to below 200° C., deep dust removal such as fabric filtering and electrostatic dust collection is carried out. The dust-removed gas enters a gas storage cabinet, which is convenient for further processing or utilization, or directly supplied to downstream chemical synthesis and clean combustion.

After a period of gasification operation, gasification operation can be conveniently and flexibly stopped by adjusting the gas pressure P1 in the liquid level adjusting furnace 101 and its pressurizing chamber 102. The apparatus enters the maintenance or waiting state, which is ready state shown in FIG. 8. The specific method is described as follows. The pressure relief port 104 is opened to release the pressure P1 inside the pressurizing chamber 102 to normal pressure. At this time, the pressure above the liquid level adjusting furnace 101 is restored to 1 atm, so that the liquid level of the molten slag and the molten iron inside the liquid level adjusting furnace 101 is increased. The liquid level of the molten iron bath 301 and the molten slag bath 302 inside the gasification furnace 201 is accordingly decreased, and separated from the particle material injection lance 7031 and the immersion oxygen lance 7032. The particle material injection lance 7031 and the immersion oxygen lance 7032 are exposed in the free space, which is convenient to take out them for offline maintenance or direct replacement. When the old particle material injection lance 7031 and immersion oxygen lance 7032 are taken out, the corresponding dummy lance model can be replaced so that nozzle of the injection lance will not be stuck.

In the maintenance or waiting state, a hot-injecting-mending, operation of the furnace liner, that is, slag-splashing for furnace protection, can be also carried out. Before slag-splashing for furnace protection, the original particle material injection lance 7031 is used to blow a slag conditioner into the molten iron bath 302 after entering the ready state shown in FIG. 8. The slag conditioner is usually calcined dolomite particles, magnesia, MgO-rich inorganic materials, minerals or refractory materials enriched in aluminum oxide and chromium oxide, which make the smelting point, viscosity, and fluidity of the molten slag meet certain requirements. After injecting, the particle material injection lance 7031 and the immersion oxygen lance 7032 are removed, and a dummy lance model with the same shape as the injection lance is placed at the original insertion position of the injection lance to block the injection lance installation port. After finishing the slag conditioning, a supersonic jet injection lance 706 is initiated, nitrogen gas is introduced, the position of the supersonic jet injection lance 706 is moved up and down, a supersonic jet is blown down, and the molten slag at the bottom of the gasification furnace 201 is splashed onto the side wall. Most of the splashed molten slag adheres to the side wall, becomes a part of the refractory material of the furnace liner, and repairs and protects the furnace wall as the temperature decreases.

The supersonic jet injection lance 706 can also be lifted to a higher position and idle during gasification operation, or it can blow oxygen-enriched air, oxygen gas, and preheated oxygen-enriched air to perform a certain degree of secondary combustion on the furnace gas, and transfer heat downward by the molten slag.

Figure 8:
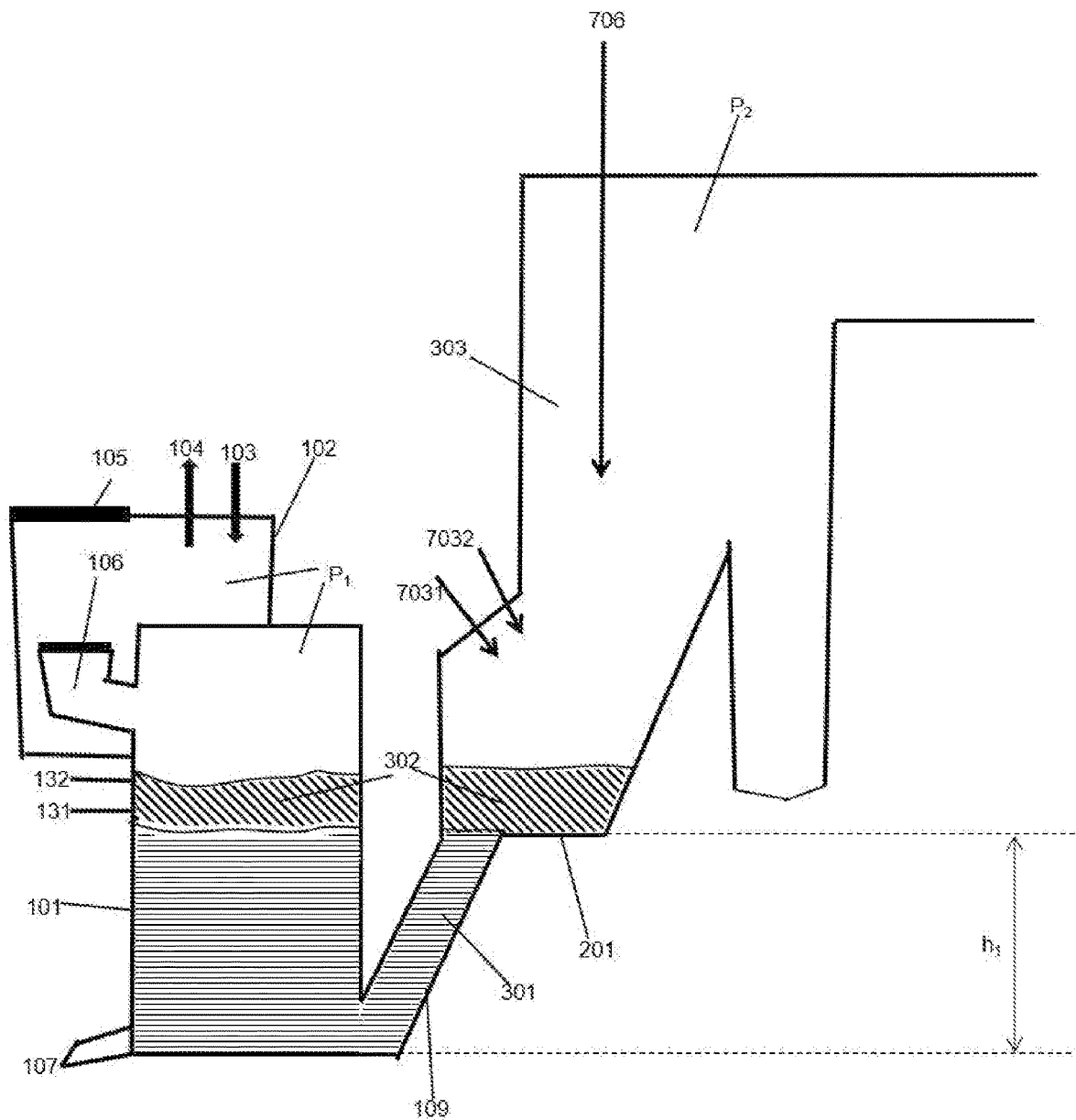
FIG. 8 is a schematic drawing of the molten bath liquid level in the initial and maintenance state.
Figure 9:
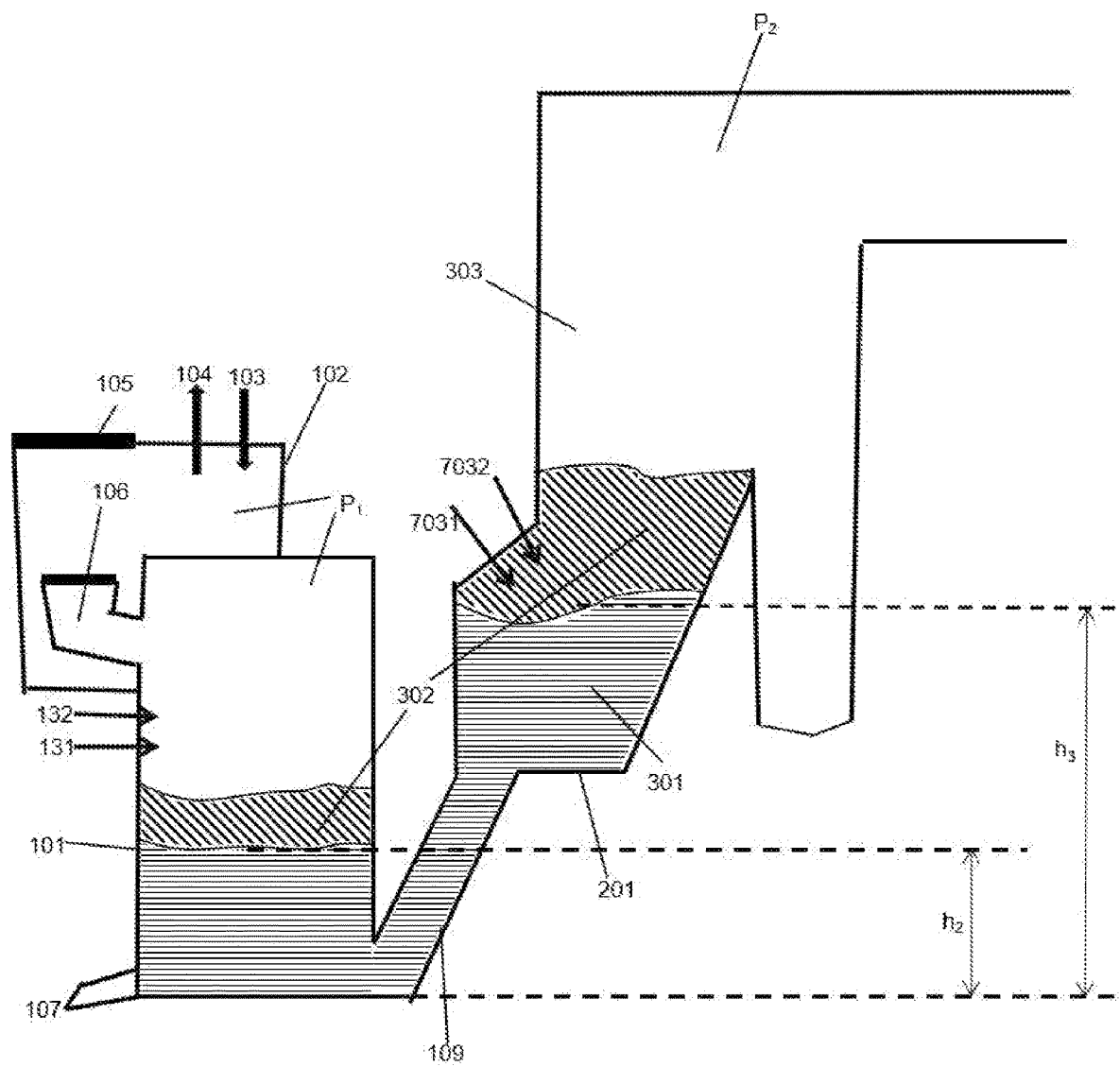
FIG. 9 is a schematic drawing of the molten bath liquid level in the gasification state.

In the maintenance and ready state shown in FIG. 8, the immersion fuel injection lance 131 and the immersion oxygen lance 132 on the side wall of the liquid level adjusting furnace 101 are immersed in the molten slag layer in the liquid level adjusting furnace 101. A certain amount of fuel and gasification materials can be blown to supplement heating of the molten pool in the liquid level adjusting furnace 101. The specific operation is similar to the carbon-oxygen reaction and secondary combustion in the gasification furnace 201. The difference is that the heat compensation of the molten slag liquid in the liquid level adjusting furnace 101 requires a complete secondary combustion of the immersion fuel injection lance 131 and the immersion oxygen lance 132 for leaving the heat to the maximum extent in the molten pool without the purpose of gas production.

If the furnace needs to be completely shut down for long-term shutdown or overhaul, in the maintenance state shown in FIG. 8, a tapping hole 107 at the bottom of the liquid level adjusting furnace 101 is opened by a machine for tapping and plugging hole. All the molten iron and the molten slag liquid are released, and the molten iron is cast into small pieces, which is convenient for use after pre-smelting in the furnace next time.

The pre-smelting methods used for the cast iron blocks includes: other electric arc furnaces, induction smelting furnaces, iron-smelting furnaces with coal oxygen or coke as fuel, or the cast iron blocks being directly loaded into the liquid level adjusting furnace 101, smelting by injection fuel using the immersion fuel injection lance 131 and the immersion oxygen lance 132, or smelting with producing chemical heat in the liquid level adjusting furnace 101 by a similar thermite method, where alumina produced by the thermite method directly enters the molten slag bath 302.

Embodiment 3

The liquid level adjusting furnace 101 has an inner height of 6000 mm and an inner diameter of 3500 mm. The gasification furnace 201 has an inner height of 9000 mm and an average inner diameter of 4000 mm. The communication pipe 109 has an inner diameter of 600 mm, and the part near the liquid level adjusting furnace 101 of the communication pipe 109 changes to flat section. The height of the port of the connecting part between the communication pipe 109 and the liquid level adjusting furnace 101 is 300 mm, the width of the connecting part is 1000 mm, and the axis length is 3000 nun. The height of the bottom of the gasification furnace 201 is 2100 mm higher than that of the liquid level adjusting furnace 101.

Pre-melted liquid molten iron is 143 tons in weight, has a carbon content of 3-5 wt %, is mixed into the liquid level adjusting furnace 101, is filled into the communication pipe 109, and reaches the bottom surface level of the gasification furnace 201. The height h1 of the molten iron liquid level in the liquid level adjusting furnace 101 is 2100 mm.

The pressure P1 in the pressurizing chamber 102 of the liquid level adjusting furnace 101 is adjusted to an absolute pressure of 0.28 MPa, while maintaining the pressure P2 of the free space of the gasification furnace 303 at an absolute pressure of 0.13 MPa, the pressure difference between the two is 0.15 MPa. The liquid level difference h3-h2 between the two is about 1750 mm, which makes the liquid level h2 of the molten iron in the liquid level adjusting furnace 101 reduce to 850 mm, the liquid level in the gasification furnace 201 rises from 0 to 900 mm, and the relative height h3 relative to the bottom of the liquid level adjusting furnace 101 is 3000 mm. Excluding the molten iron in the communication pipe 109, the mass of the molten iron in the gasification furnace 201 with inner height of 9000 mm and diameter of 4000 mm is 80 tons. The residual molten iron in the liquid level adjusting furnace 101 is 57 tons, and the remaining molten iron in the communication pipe 109 is about 6 tons.

Figure 7:
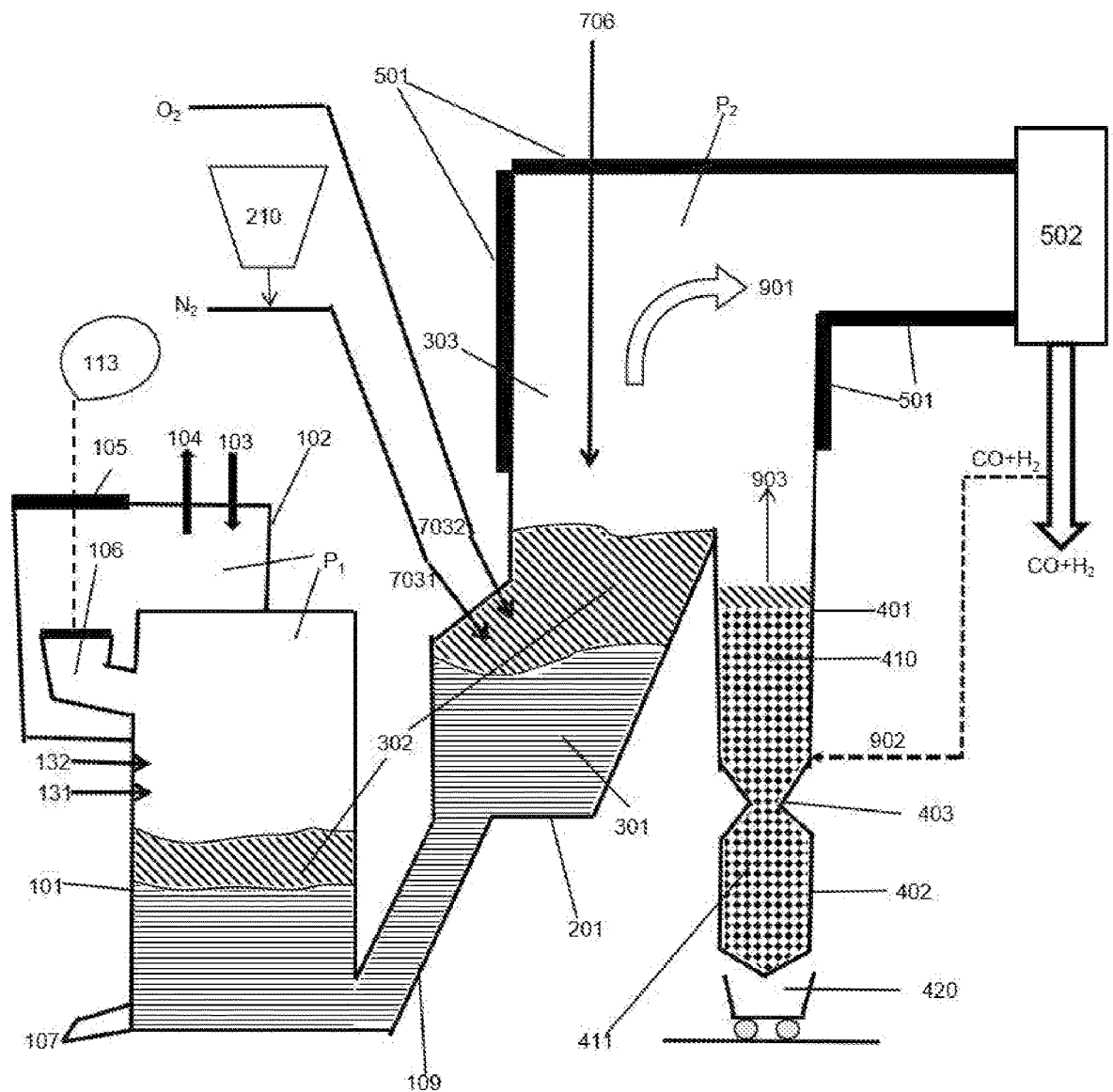
FIG. 7 is a schematic structural drawing of a gasifier for organic solid waste by injection into molten iron and slag bath with a liquid level adjustment function.

In order to facilitate the installation of the particle material injection lance 7031 and the immersion oxygen lance 7032 on the side wall, a bending section is arranged at a side wall of the gasification furnace 201, as shown in FIG. 7. The particle material injection lance 7031 and the immersion oxygen lance 7032 can be inserted into the molten pool at a steeper angle. The particle material injection lance 7031 is inserted into the gasification furnace 201 from the furnace wall at an angle of 50 degrees to the horizontal plane, and the lower end is 1100 mm away from the bottom surface of the gasification furnace 201. The immersion oxygen lance 7032 is inserted into the gasification furnace 201 from the furnace wall at an angle of 40 degrees to the horizontal plane, and the lower end is 1150 mm away from the bottom surface of the gasification furnace 201. The projections of the particle material injection lance 7031 and the immersion oxygen lance 7032 on the ground are at an angle of 45 degrees. The thickness of the molten slag liquid above the molten iron bath 301 in the gasification furnace 201 is 400-500 mm, and the distance between the slag overflow port and the bottom surface is 2000 mm. The slag discharge and heat exchange shaft furnace 401 has an inner diameter of 2000 mm and an inner height of 4000 mm. The lower gas inlet introduces the cooled syngas 902 that has been cooled to 200° C. The amount of the cooled syngas 902 is 20-40% of the new produced syngas. The cooled syngas 902 is subjected to heat exchange with the hot slag 410 to form the heat-returning syngas 903, is mixed with the new produced syngas 901, and is used to cool the new produced syngas 901.

The vertical section of the vaporization cooling flue 501 has a height of 6000 mm and an inner diameter of 6000 mm. After reaching the top, it turns into a horizontal section or an inclined section. The horizontal or inclined section of the vaporization cooling flue has an inner diameter of 3000 mm and a length of 10 meters. The supersonic jet injection lance 706 passes through the top of the vaporization cooling flue 501 and enters the furnace. The type of the gas to be blown can be switched among oxygen gas, nitrogen gas, and preheated oxygen-enriched air.

The particle material injection lance 7031 blows materials below 3 mm for 10-20 t/hr, 0.7-1.0 MPa compressed nitrogen gas can be used as carrier gas for injecting, and the flow rate of the carrier gas is 1100 $NM^3$/br. The immersion oxygen lance 7032 adopts supersonic jet blowing or ordinary injection pipe, the pressure reaches 0.8-1.2 MPa, the Mach number reaches 1.5-2.0, and the flow rate can reach 15000 $NM^3$/hr. The supersonic jet injection lance 706 can blow oxygen-enriched air, oxygen-enriched air preheated to 1200° C., normal temperature industrial pure oxygen gas, etc. to perform a certain degree of secondary combustion for thermal compensation of the slag. The supersonic jet injection lance 706 is switched to blow nitrogen gas in the ready state, and the molten slag after conditioning is splashed and protects the furnace at a large flow rate. The volume of syngas CO and $H_2$ that is produced per ton of typical combustible organic materials is 1000-2000 $NM^3$/t.

Embodiment 4

High-sulfur coal is used for gasification, and pure oxygen is used as the gasifying agent, and the apparatus of Embodiment 2 is used to perform injection and gasification. The main industrial analysis, elemental analysis and calorific value of high sulfur coal are as follows.

TABLE 3

| composition analysis of high sulfur coal | | | | | | | | |
|---|---|---|---|---|---|---|---|---|
| Analysis of high sulfur coal/% (as received basis) | | | | | | | | $Q_{net,ar}$ |
| C | H | O | N | S | M | A | V | kJ/kg |
| 80.35 | 1.19 | 0.90 | 0.68 | 3.21 | 4.01 | 9.66 | 3.48 | 30131 |

Water vapor and pure oxygen gas are mixed for gasification in order to prevent the molten pool from overheating because the fuel has the high carbon content, and water vapor accounts for 22% of the volume of the gasifying agent.

In the syngas, CO volume accounts for 81%, $H_2$ volume accounts for 19%, calorific value is 12.7 MJ/NM, gas production of the fuel is 1860 $NM^3$/t, and initial coal gas temperature is 1500° C. Waste heat recovery by syngas that is produced by cooling per ton of fuel is used for producing 3 tons of 1.2 MPa steam, carbon atom conversion rate is 99%, and cold coal gas efficiency is 78%.

The sulfur content of the coal gas can be as low as 20-30 ppm, which means that the subsequent combustion may not even be specifically desulfurized, or desulfurization task may be reduced a lot in the case of excessive air coefficient. The coarse hot coal gas has a high dust content, which can reach 10-50 $g/M^3$, and the dust content after cooling and dust removal can reach 10 $mg/M^3$.

Embodiment 5

Harmless, reduction, resourceful, energy-based treatment of medical hazardous waste, cyanide-containing hazardous waste, waste mineral oil, medical pesticides and other hazardous solid wastes, organic residues, paint wastes, etc., includes performing physical form of crushing treatment, injecting into the molten iron bath to perform gas production reaction to obtain syngas mainly composed of CO and $H_2$. The organic substances are converted well, the inorganic substances enter the slag. Lime, silicate or borate is blown, and the glassy state solidification is performed according to the sulfur and halogen levels, to achieve reduction and harmlessness. In this process, the gas to be processed, which contains high-concentration VOCs, can be used as the injecting carrier gas of the above-mentioned solid materials or liquid combustibles, so that the VOCs can be safely disposed in the dual molten bath at the same time.

Embodiment 6

Mixed waste plastics including polyethylene, polypropylene, polyvinyl chloride, ABS, polyacrylonitrile, polyurethane and other plastic mixtures can be treated and converted. The mixed waste plastics that have calorific value of 35 MJ/kg and chlorine content of about 8%, are prepared into particles less than 3 mm, and are blown into the dual molten bath of the above embodiments using the nitrogen gas as the carrier gas. The temperature of the molten iron-molten slag bath is maintained at 1200-1400° C., the injection volume is 10-15 tons per hour. Pure oxygen is introduced as a gasifying agent at the same time, and excess lime is added according to the stoichiometric ratio of $CaCl_2$ for absorbing chlorine. Each ton of waste plastics is converted into syngas of 2200 $NM^3$ having the following main components: CO volume content 48%, $H_2$ volume content 48%, nitrogen gas ratio 3%, which have the calorific value of 12 $MJ/NM^3$, where 90% chlorine elements enter the slag in the form of $CaCl_2$, and the remaining chloride enters the dust removal system along with the flue gas. The cooling and dust removal system further recovers the residual chlorine in the flue gas through a system similar to lime desulfurization. The furnace gas is cooled and subjected to heat exchange, and 3 tons of steam by-product is produced per ton of waste plastic.

Embodiment 7

Waste rubber tires can be treated and converted. Waste rubber tires contain rubber, carbon black, sulfur, zinc oxide, steel wire, etc. The above-mentioned compositions can be well treated and recovered in the molten iron bath-molten slag bath gasification process. The waste tires are subjected to mechanical and freeze crushing, blown into the dual molten bath of molten iron and molten slag, and subjected to gasification in oxygen gas or oxygen-enriched air. Rubber and carbon black, as carbon and hydrocarbons, are thoroughly gasified into syngas. The sulfur is absorbed by the molten iron, then absorbed by CaO in the blown additive lime and the limestone, and becomes CaS entering the slag and discharged. ZnO as tire filler is reduced by carbon in molten iron in the molten iron bath. ZnO as a weak reducing agent and gasifying agent provides oxygen and participates in the gasification of dissolved carbon in the molten iron. The generated metal zinc vapor escapes from the molten pool with the furnace gas, most of it is recovered as metal zinc after cooling, and a small amount of Zn vapor is oxidized again into ZnO entering the dust. The steel wire enters directly into the molten iron bath, and is supplemented as part of the molten iron.

Embodiment 8

After calculating the heat balance, the complex sludge and residue with high water content as well as a small amount of sewage and waste water, when not suitable to be treated after drying, can be blown into the dual molten bath for harmless and reduction treatment, mixed with waste plastics, waste rubber tires, hazardous wastes of high calorific values, etc. Sewage is used as a gasifying agent. A higher secondary combustion rate is obtained for heat balance of the molten pool by injection oxygen and preheated oxygen-enriched air, and a certain amount of syngas containing $H_2$ and CO combustible gases is produced. Inorganic substances are converted into the molten slag to be discharged.

Embodiment 9

Biomass straw, including but not limited to ordinary straw, sweet sorghum straw, forestry processing waste, forestry branches, livestock manure, etc, can be treated and converted. The above-mentioned biomass straw is firstly piled up, dried naturally or mechanically squeezed to remove part of the water, then deep crushed and dried. The heat source used is the hot steam recovered by the sensible heat recovery device of the gasification furnace for drying raw material against moisture, so that the moisture content of the biomass straw is further reduced. Then the biomass straw is blown into the dual molten bath of the gasification furnace for gasification. A higher secondary combustion rate is adopted to ensure the heat balance of the molten pool, and syngas production of the raw material is 880 $NM^3/t$. Organic substances containing ammonia and nitrogen is converted into $N_2$ by the molten iron bath, and then harmlessly discharged into the atmosphere. The phosphorus-containing material eventually becomes calcium phosphate in the molten slag and can be used as agricultural soil fertilizer.

Embodiment 10

Domestic waste from complex sources can be treated and converted. Mixed domestic waste without any sorting is subjected to preliminary crushing, sorting, and separation. After separating metals, paper, glass, and plastic that can be directly recycled, extruding dehydration, thermally drying and evaporation dehydration are performed. The steam generated by recovering the physical sensible heat of the syngas and mixed gas is used to generate electricity, and the steam generated by recovering the sensible heat of the syngas is further used to dry and dehydrate the raw materials. Dried materials is further broken and crushed, and placed in a powder injection tank. Chemically excessive CaO particles are prepared in other powder injection equipment according to their chlorine levels. The domestic waste enters the molten iron-molten slag bath under the pneumatic conveyance of nitrogen gas as a carrier gas. The oxygen-enriched air with 45% oxygen preheated to 1200 degrees Celsius is blown as the gasifying agent, and gas production in the dual molten bath is performed. Finally, the obtained syngas production of materials is 820 $NM^3/t$.

In summary, it can be seen from the above embodiments that the apparatus and method are almost suitable for the treatment of all organic solid waste with a certain calorific value, as well as the resourceful, harmless, reduction, and energy-based utilization. Organic substances in mixed and complex materials are thoroughly utilized and converted into clean syngas. Inorganic substances are converted or partially recycled by the molten slag. The materials which are more difficult to be processed by traditional lower temperature treatment method, have more obvious advantages by immersion and conversion in the ultra-high temperature dual molten bath of the apparatus and method. With the apparatus and method, there is almost no dilemma in which organic substances are difficult to be treated, there is also no secondary pollution generated by the organic substances themselves and their treatment processes, and there are no other poisons in the organic substance treatment process. Even inorganic substances can be safely treated to a certain degree by adjusting the alkalinity of the molten slag, calcification or vitrification. More importantly, organic substances containing calorific values are converted into universal carbon fuel gas which is not only an ideal secondary energy, but also a raw material for the synthesis of larger number of more extensive chemical products.

What is claimed is:

1. A gasifier for organic solid waste by injection into molten iron and slag bath, comprising a gasification furnace, a liquid level adjusting furnace and a slag discharge and heat exchange shaft furnace, wherein, the gasifier is configured to blow organic solid waste into a molten iron bath and a molten slag bath floating on the molten iron bath, to perform ultra-high temperature pyrolysis and react with a gasifying agent to produce combustible syngas;

the gasification furnace is closed, and at least one particle material injection lance, installed at a side wall of the gasification furnace, is configured to inject solid particles and is immersed in the molten slag bath or the molten iron bath, and a supersonic jet injection lance is installed at the top of the gasification furnace e liquid level adjusting furnace;

the liquid level adjusting furnace is closed, and a bottom of the liquid level adjusting furnace is in communication with a bottom of the gasification furnace through a communication pipe, an upper part of the liquid level adjusting furnace is provided with a molten iron pouring tank, the molten iron pouring tank is provided in communication with a sealing pressure-bearing mechanism, and a tapping hole is provided at the bottom of the liquid level adjusting furnace; and the slag discharge and heat exchange shaft furnace is in communication with an upper part of the gasification furnace, and the slag discharge and heat exchange shaft furnace is configured to hold liquid molten slag autonomously overflowing from the gasification furnace, to cool the liquid molten slag to a low-temperature solid phase, and to discharge the liquid molten slag.

2. The gasifier according to claim 1, further comprising a vaporization cooling, wherein the vaporization cooling flue is in communication with the upper part of the gasification furnace.

3. The gasifier according to claim 2, further comprising a dust removal and heat recovery boiler, wherein, a gas inlet of the dust removal and heat recovery boiler is in communication with a gas outlet of the vaporization cooling flue.

4. The gasifier according to claim 3, wherein, the dust removal and heat recovery boiler is in communication with a bottom of the slag discharge and heat exchange shaft furnace through a gas return pipe.

5. The gasifier according to claim 4, wherein, a bottom of the slag discharge and heat exchange shaft furnace is provided in communication with a slag-cooling sealing bucket, a slag-locking valve is provided between the slag-cooling sealing bucket and the slag discharge and heat exchange shaft furnace, and a bottom of the slag-cooling sealing bucket is provided with a valve.

6. The gasifier according to claim 2, wherein, the vaporization cooling flue has a vertical section uprightly above the gasification furnace, and an inner diameter of the vertical section is 1.3 to 2 times an inner diameter of the gasification furnace.

7. The gasifier according to claim 1, wherein, at least one immersion oxygen lance is installed on the gasification furnace, and the at least one immersion oxygen lance is configured to supply an oxygen-containing gas gasifying agent and is immersed in the molten slag bath or the molten iron bath.

8. The gasifier according to claim 1, wherein, a nozzle position of the t least one particle material injection lance is located 100-300 mm above a liquid level of the molten iron bath, and is immersed in the molten slag bath, a nozzle of the particle material injection lance is inclined downward at an angle of 40-60 degrees with a horizontal plane, an extended line of the nozzle intersects with an interface between the molten iron bath and the molten slag bath, and a distance from an intersection point to a geometric center of the interface between the molten iron bath and the molten slag bath does not exceed ½ of a geometric radius of the interface between the molten iron bath and the molten slag bath.

9. The gasifier according to claim 1, wherein, the sealing pressure-bearing mechanism comprises a pressurizing chamber, a pressurizing inlet, a pressure relief port, and a sealing cover, wherein, the pressurizing inlet, the pressure relief port and the sealing cover are respectively installed on the pressurizing chamber.

10. The gasifier according to claim 1, wherein, an immersion fuel injection lance and an immersion oxygen lance is installed on a side wall of the liquid level adjusting furnace, the immersion fuel injection lance is configured to inject an auxiliary slagging agent and is immersed in the molten slag bath or the molten iron bath, and the immersion oxygen lance is configured to supply a kind of oxygen-containing gas as gasifying agent and is immersed in the molten slag bath or the molten iron bath.

11. The gasifier according to claim 1, wherein, a bottom of the slag discharge and heat exchange shaft furnace is provided in communication with a slag-cooling sealing bucket, a slag-locking valve is provided between the slag-cooling sealing bucket and the slag discharge and heat exchange shaft furnace, and a bottom of the slag-cooling sealing bucket is provided with a valve.

* * * * *